US009986582B2

(12) United States Patent
Wang

(10) Patent No.: US 9,986,582 B2
(45) Date of Patent: May 29, 2018

(54) DETERMINATION OF COMMUNICATION CONTROL PARAMETER BASED ON COMMUNICATION SCHEDULE

(71) Applicant: QUALCOMM Incorporated, San Diego, CA (US)

(72) Inventor: Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 14/015,886

(22) Filed: Aug. 30, 2013

(65) Prior Publication Data

US 2015/0063182 A1      Mar. 5, 2015

(51) Int. Cl.
| | | |
|---|---|---|
| H04J 1/16 | (2006.01) | |
| H04W 4/00 | (2018.01) | |
| H04W 72/12 | (2009.01) | |
| H04W 16/14 | (2009.01) | |
| H04W 84/12 | (2009.01) | |

(52) U.S. Cl.
CPC ....... *H04W 72/1215* (2013.01); *H04W 16/14* (2013.01); *H04W 76/28* (2018.02); *H04W 84/12* (2013.01)

(58) Field of Classification Search
CPC ......... H04W 72/1215; H04W 52/0229; H04W 36/0005; H04W 88/06; H04B 1/406; H04B 1/1027; H04L 1/20
See application file for complete search history.

(56) References Cited

U.S. PATENT DOCUMENTS

| | | | |
|---|---|---|---|
| 2006/0025178 A1* | 2/2006 | Tao et al. | ............. 455/562.1 |
| 2008/0125047 A1 | 5/2008 | Li et al. | |
| 2008/0232284 A1* | 9/2008 | Dalsgaard et al. | ........... 370/310 |
| 2009/0207801 A1 | 8/2009 | Morton et al. | |
| 2010/0099431 A1 | 4/2010 | Sampath et al. | |
| 2011/0312288 A1* | 12/2011 | Fu et al. | ............. 455/88 |
| 2012/0040620 A1* | 2/2012 | Fu | ......... H04B 1/1027 |
| | | | 455/63.1 |
| 2012/0082140 A1 | 4/2012 | Lin et al. | |
| 2012/0164948 A1* | 6/2012 | Narasimha et al. | ........ 455/63.1 |
| 2012/0207040 A1 | 8/2012 | Comsa et al. | |
| 2013/0021995 A1 | 1/2013 | Ehsan et al. | |

(Continued)

FOREIGN PATENT DOCUMENTS

WO      2009114583 A2      9/2009

OTHER PUBLICATIONS

International Search Report and Written Opinion—PCT/US2014/053187—ISA/EPO—Nov. 10, 2014.

*Primary Examiner* — Melanie Jagannathan
(74) *Attorney, Agent, or Firm* — Arent Fox, LLP

(57) ABSTRACT

A communication control parameter for communicating via one technology is determined based on a communication schedule used in another technology. In some aspects, interference between a wireless local area network and a wireless wide area network is mitigated by appropriate selection of the communication control parameter. In some aspects, enhanced media access control features of IEEE 802.11ah are employed to facilitate co-existence between radio technologies. For example, interference may be mitigated through the use of a restricted access window, a target wake time, sectorized antennas, scheduled control information transmissions, and rate selection for control information.

35 Claims, 14 Drawing Sheets

(56) References Cited

U.S. PATENT DOCUMENTS

| | | |
|---|---|---|
| 2013/0086653 A1 | 4/2013 | Gupta |
| 2013/0121265 A1 | 5/2013 | Awoniyi et al. |
| 2013/0176873 A1* | 7/2013 | Ji et al. .................. 370/252 |
| 2013/0188541 A1* | 7/2013 | Fischer .................. 370/311 |
| 2013/0194994 A1* | 8/2013 | Dayal ................ H04W 76/048 370/311 |
| 2014/0036748 A1* | 2/2014 | Mukherjee et al. .......... 370/311 |
| 2014/0313910 A1* | 10/2014 | Appleton ................ H04L 1/20 370/252 |

* cited by examiner

DETERMINATION OF COMMUNICATION CONTROL PARAMETER BASED ON COMMUNICATION SCHEDULE

BACKGROUND

Field

This application relates generally to communication and more specifically, but not exclusively, to determining a communication control parameter.

Introduction

Co-existence issues (e.g., interference) may arise in wireless communication systems. For example, co-existence issues may arise in deployments where different radios (transceivers) are co-located. Co-located radios may include, for example, radios implemented within the same device (e.g., within the same access terminal or the same access point) or radios deployed close to one another (e.g., within one meter). Co-existence issues may arise in deployments where radios use similar frequencies.

SUMMARY

A summary of several sample aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to techniques for facilitating co-existence between radios. To this end, communication control parameters for communicating via one technology (e.g., IEEE 802.11ah) may be selected based on a communication schedule used in another technology (e.g., LTE).

The disclosure relates in some aspects to techniques for mitigating interference between wireless local area network (WLAN) and wireless wide area network (WWAN) technologies. An IEEE 802.11ah apparatus may use a 900 MHz band. Use of this band may interfere with reception at a WWAN apparatus such a 2G, 3G, or LTE apparatus that uses a band that is near the 900 MHz band or a band that is affected by harmonics of the 900 MHz band. Conversely, use of such a band by a WWAN apparatus may interfere with reception at an IEEE 802.11ah apparatus.

The disclosure relates in some aspects to using enhanced media access control (MAC) features of 802.11ah to facilitate co-existence. For example, interference may be mitigated through the use of one or more of: a restricted access window, a target wake time, sectorized antennas, scheduled control information transmissions, or rate selection for control information.

In some implementations, a restricted access window (e.g., that specifies when 802.11ah stations (STAs) have exclusive access to a medium) is scheduled to occur during a discontinuous reception (DRX) OFF period of a nearby (e.g., co-located) LTE radio. In this way, transmissions by the LTE radio (during the DRX ON period) will not occur during the restricted access window (RAW). Consequently, an 802.11ah radio that is receiving during the RAW will not be desensitized by a nearby LTE radio. Conversely, transmissions by the 802.11ah radios will not occur during the DRX ON period. Consequently, an LTE radio that is receiving during the DRX ON period will not be desensitized by a nearby 802.11ah radio.

In some implementations, a target wake time (e.g., that specifies when 802.11ah STAs will be awake to communicate with an access point) is scheduled to occur during a discontinuous reception (DRX) OFF period of a nearby (e.g., co-located) LTE radio. In this way, an access point will not transmit during the DRX ON period. Consequently, an LTE radio that is receiving during the DRX ON period will not be desensitized by a nearby 802.11ah access point.

In 802.11ah implementations that use sectorized antennas (e.g., beamforming), the sector to be used may be selected to minimize co-existence issues. For transmissions, the sector that results in the least amount of interference to a nearby LTE radio may be selected. For reception, the sector that results in the least amount of interference from an LTE radio may be selected.

In some implementations, control information (e.g., traffic indication map (TIM) information) is transmitted only during a discontinuous reception (DRX) OFF period of a nearby (e.g., co-located) LTE radio. In this way, the control information may be more reliably received since the receiving 802.11ah radios will not be desensitized by a nearby LTE radio.

In some implementations, the rate used for transmitting control information (e.g., control response frames such as ACKs) may be selected to minimize co-existence issues. For example, in the presence of interference, a lower rate may be used for transmitting the control information (e.g., lower than the rate used for transmitting data) to ensure that the control information is reliably received.

BRIEF DESCRIPTION OF THE DRAWINGS

These and other sample aspects of the disclosure will be described in the detailed description and the claims that follow, and in the accompanying drawings, wherein:

Figure 1:
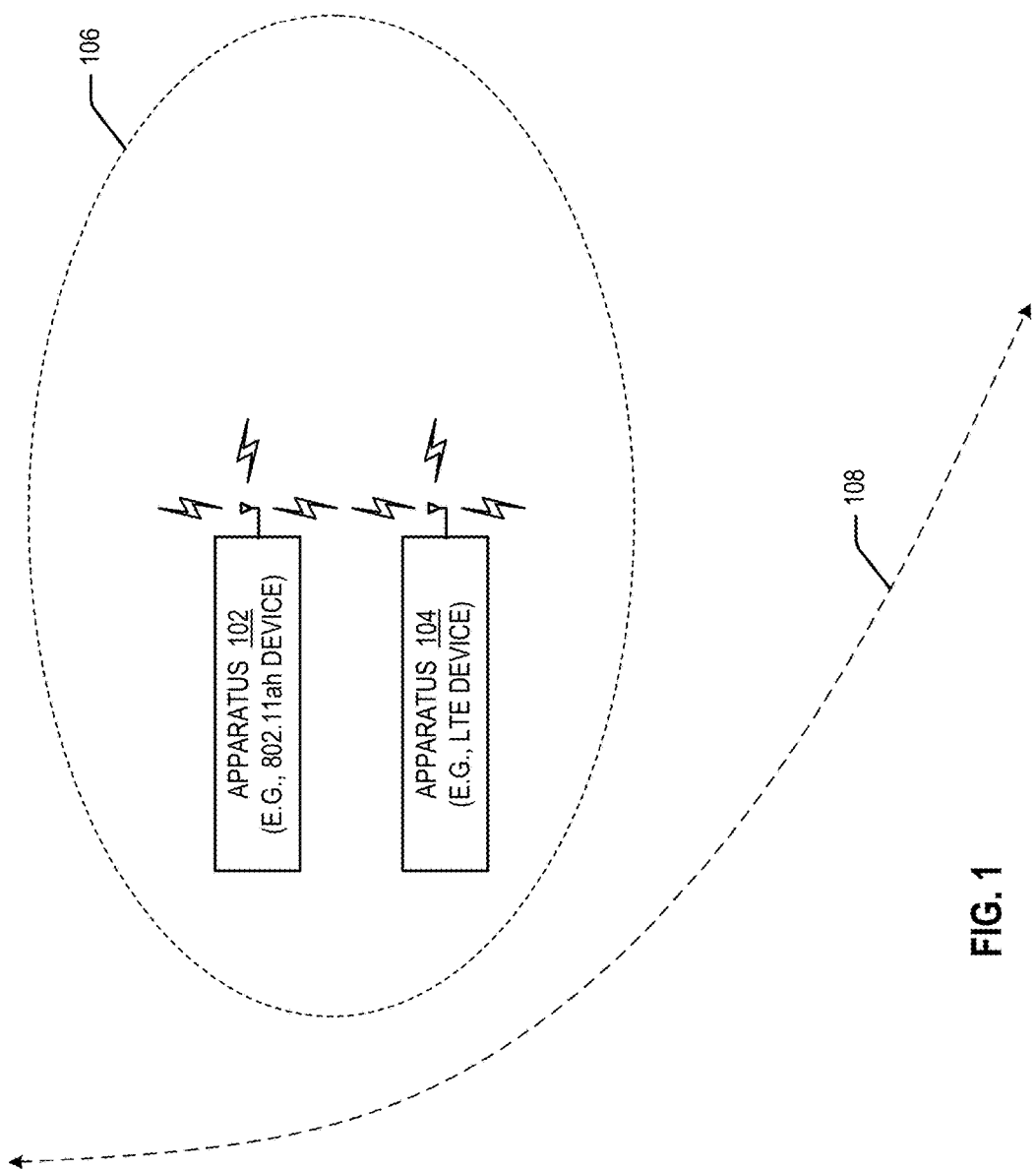
FIG. 1 illustrates an example of a wireless communication system where co-existence issues may arise between apparatuses.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, a method of communication comprises determining, at a first apparatus, a communication schedule of a first transceiver associated with a first technology; and communicating with a second apparatus to determine at least one communication control parameter for communicating via a second technology, wherein the determination of the at least one communication control parameter is based on the determined communication schedule. In addition, in some aspects, the first technology comprises LTE technology; and the second technology comprises IEEE 802.11ah technology.

FIG. 1 illustrates a simplified example of a communication system that includes an apparatus 102 and an apparatus 104. Co-existence issues may arise if the apparatuses 102 and 104 are located near one another and use similar or related communication frequencies. For example, the apparatus 102 may comprise an 802.11ah device that uses the 900 MHz band, while the apparatus 104 may comprise an LTE device that uses a band near the 900 MHz band or a band that is near a harmonic of the 900 MHz band.

The coverage areas of the apparatuses 102 and 104 are represented in a simplified manner by dashed lines in FIG. 1. Specifically, the apparatus 102 has a smaller coverage area (e.g., an 802.11ah range of one mile or less) as represented by a dashed line 106, while the apparatus 104 has a larger coverage area (e.g., an LTE range of several miles) as represented by a dashed line 108. Thus, either apparatus 102 or 104 may be communicating with another apparatus (not shown in FIG. 1) that is relatively far away. Consequently, transmissions by the apparatus 102 may interference with reception at the apparatus 104, or vice versa, thereby causing severely degraded performance at the receiver. Moreover, in a scenario where the apparatuses 102 and 104 are co-located (e.g., located within one meter of one another), the transmissions by one apparatus may desensitize (e.g., overwhelm the receiver of) the other device.

The disclosure relates in some aspects to enabling apparatuses that use different technologies (e.g., different radio access technologies) such as the apparatuses 102 and 104 to effectively co-exist even though they may be relatively close to one another and use the same or related communication frequencies. For example, a communication control parameter for communicating via one of the technologies may be determined based on a communication schedule used in the other technology. By proper selection of the communication parameter, interference between the apparatuses 102 and 104 may be avoided.

Figure 2:
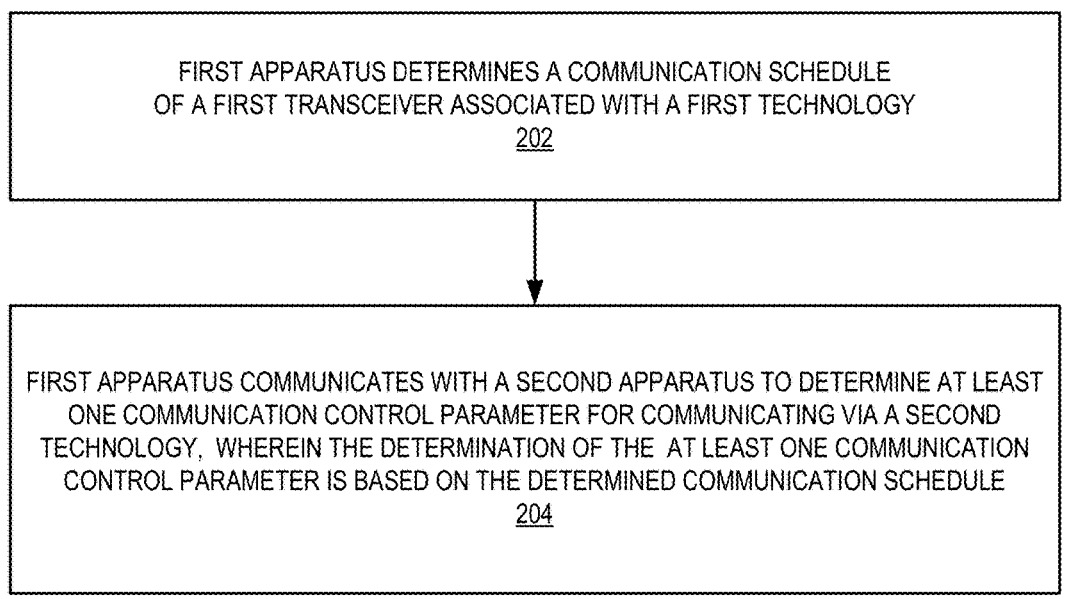
FIG. 2 is a flowchart of several sample aspects of operations relating to determining a communication control parameter.

FIG. 2 illustrates an example of operations that may be employed to determine a communication control parameter in accordance with the teachings herein. For purposes of illustration, the operations of FIG. 2 (or any other operations discussed or taught herein) may be described as being performed by specific components (e.g., components of FIG. 1, 7, 11, or 13-18). These operations may be performed by other types of components and may be performed using a different number of components in other implementations. Also, it should be appreciated that one or more of the operations described herein may not be employed in a given implementation. For example, one entity may perform a subset of the operations and pass the result of those operations to another entity.

As represented by block 202 of FIG. 2, a first apparatus determines a communication schedule of a first transceiver associated with a first technology. The communication schedule may take different forms in different implementations. In some cases, the communication schedule may comprise a DRX schedule of an access point that supports LTE or some other suitable technology. In some cases, the communication schedule may comprise a power save schedule (e.g., indicating when a transceiver is in a low power state and in a normal operating state). In some cases, the communication schedule may comprise a periodic schedule (e.g., a schedule that repeats with a known periodicity).

The first apparatus may determine the communication schedule in various ways. For example, the first transceiver may broadcast a radio frequency (RF) signal comprising an indication of the communication schedule. In this case, the first apparatus may determine (e.g., obtain) the communication schedule by receiving the broadcasted RF signal. As another example, if the first apparatus is able to communicate with another apparatus that comprises the first transceiver, the first apparatus may be able to query the other apparatus for the communication schedule. In this case, the first apparatus may determine (e.g., obtain) the communication schedule by receiving a message from the other apparatus. This communication may involve over-the-air messaging, backhaul messaging (e.g., in a scenario where the apparatuses are access points), or some other type of messaging. As another example, if the first apparatus is able to communicate with some other apparatus that has the communication schedule, the first apparatus may be able to query this other apparatus for the communication schedule. In this case, the first apparatus may determine the communication schedule by receiving a message from the other apparatus. Again, the communication may involve over-the-air messaging, backhaul messaging, or some other type of messaging. As yet another example, an apparatus may maintain a record of the communication schedule in a memory device (e.g., in a scenario where the communication schedule was previously loaded into the first apparatus). In this case, the first apparatus may determine the communication schedule by retrieving the communication schedule from the memory device.

The first technology is associated with a first coverage area. For example, if the first technology is a WWAN (e.g., LTE), the first coverage area will correspond to relatively large coverage.

As represented by block 204, the first apparatus communicates with another apparatus to determine at least one communication control parameter for communicating via a second technology, where the determination of the at least one communication control parameter is based on the determined communication schedule. For example, the first apparatus may comprise a transceiver that uses the second technology to communicate with another device (e.g., a peer, an access point, an access terminal, etc.) that also uses the second technology. In conjunction with this communication, a communication control parameter that enables these apparatuses to avoid interference with the first technology may be selected and shared between the first apparatus and the other apparatus. Thus, the apparatuses will each use the selected communication control parameter when communicating via the second technology, thereby facilitating co-existence with the first technology. For example, interference between a transceiver of the first apparatus (that is associated with the second technology) and the first transceiver of some other apparatus (that is associated with the first technology) may be mitigated in a situation where the transceivers are relatively close to one another (e.g., co-located).

The communication control parameter may be determined in various ways. In some scenarios, one apparatus (e.g., an access point) autonomously selects the parameter to be used. In this case, the apparatus that selects the parameter will send an indication of the parameter (e.g., via a message) to the other apparatus that uses the second technology. In some scenarios, these apparatuses (e.g., an access point and an access terminal) cooperate to select the parameter to be used. For example, the apparatuses may negotiate (e.g., via messaging) to select a mutually agreeable parameter.

The second technology is associated with a second coverage area that may be smaller than the first coverage area. For example, if the second technology is a WLAN (e.g., 802.11-based) and the first technology is a WWAN, the second coverage area will be smaller than the first coverage area.

As previously discussed, the communication control parameter determined at block 204 may take different forms in different implementations. Several examples of communication control parameters will now be described in more detail in conjunction with FIGS. 3-12.

Figure 3:
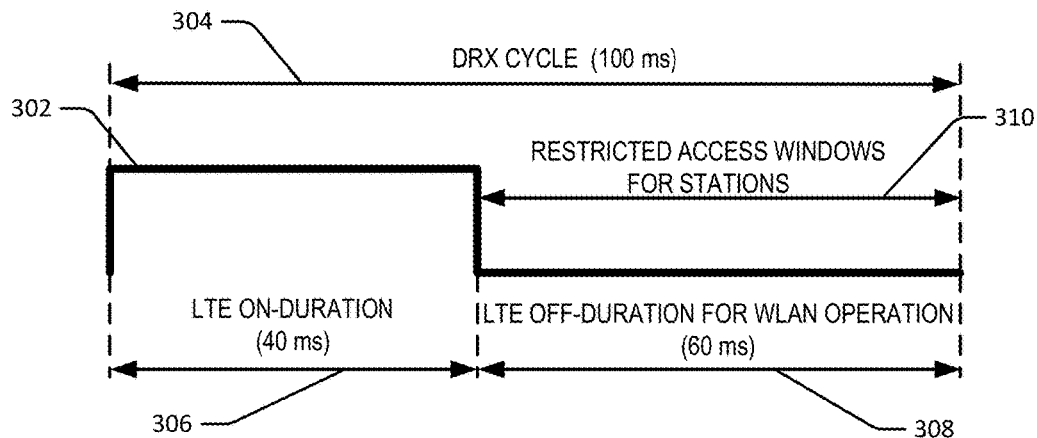
FIG. 3 illustrates an example of timing for a restricted access window.
Figure 4:
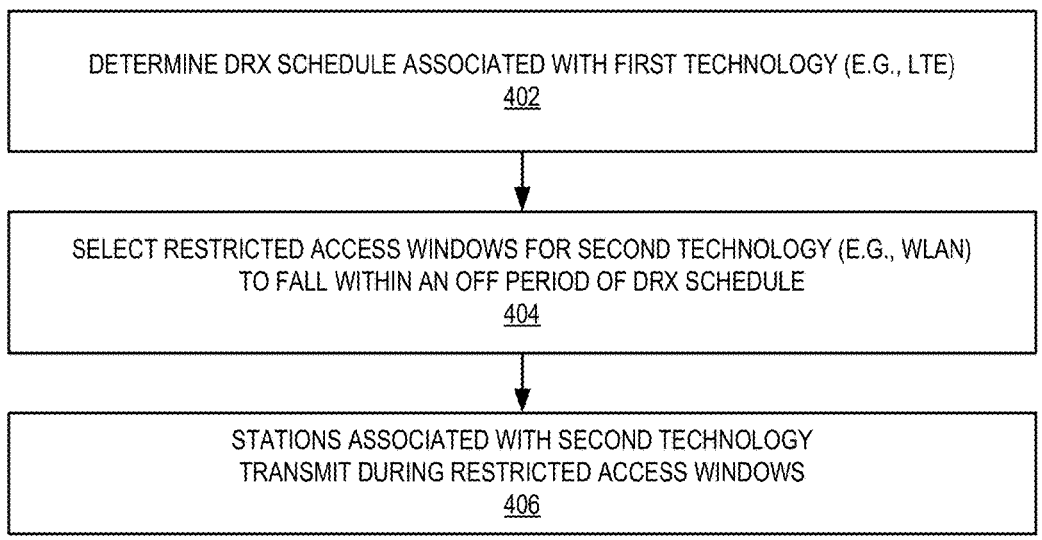
FIG. 4 is a flowchart of several sample aspects of operations relating to selecting a restricted access window.

FIGS. 3 and 4 relate to the use of a restricted access window. In 802.11ah, an access point may assign to each station (or each group of stations) a restricted access window. The restricted access window specifies a period of time during which the station (or station group) has exclusive access to the communication medium.

An apparatus may inform an associated apparatus of the restricted access window to be used in various ways. For example, a restricted access window schedule may be indicated in a beacon, indicated during association, or indicated in a management frame sent after a beacon.

Some technologies (e.g., LTE) employ discontinuous reception (DRX) to conserve system resources. DRX defines an ON period and an OFF period. In practice, during the DRX-ON period, an apparatus associated with this technology (e.g., LTE) could desensitize a nearby 802.11ah receiver or vice versa.

In accordance with the teachings herein, a restricted access window may be utilized such that an 802.11ah station will only send data when the apparatuses associated with the other technology (e.g., LTE) are not transmitting or receiving. In particular, the 802.11ah station may send data during a DRX-OFF period (also referred to herein as an off-duration). By restricting stations to only send data during the DRX-OFF period, interference with the technology that employs the DRX may be avoided.

FIG. 3 illustrates an example of a restricted access window that is defined within a DRX cycle 302. In this example, the total duration 304 of the DRX cycle 302 is 100 milliseconds, the on-duration 306 of the DRX cycle 302 is 40 milliseconds, and the off-duration 308 of the DRX cycle 302 is 60 milliseconds. It should be appreciated that these durations may have values different from the values shown in FIG. 1 in different implementations.

As indicated by the restricted access windows for stations period 310, any restricted access windows defined for WLAN operation will be specified to occur within the DRX off-duration 308.

FIG. 4 illustrates an example of operations that may be employed to select a restricted access window. One or more of these operations may be performed by an access point, an access terminal, or some other suitable apparatus.

As represented by block 402, a DRX schedule associated with a first technology is determined. For example, an 802.11ah access point may receive information about the DRX cycle used by a co-located LTE device. This information may be received from the LTE device or some other apparatus (e.g., a network entity). Conversely, in some implementations, the parameters of the DRX cycle may be defined (e.g., by an apparatus that defined the restricted access window), whereby the apparatus that uses the DRX cycle is told what DRX parameters to use.

As represented by block 404, restricted access windows for a second technology are selected so that each restricted access window falls within an off period of the DRX schedule. For example, a restricted access window may be defined as shown in FIG. 3.

As represented by block 406, stations associated with the second technology (e.g., stations served by an access point that performs the operations of blocks 402 and 404) will then transmit during the designated restricted access window. Accordingly, the serving access point will monitor for transmissions during this time as well. Advantageously, as the stations will not transmit during the DRX-ON period, the serving access point may perform other operations or enter a low power state during this time period.

Figure 5:
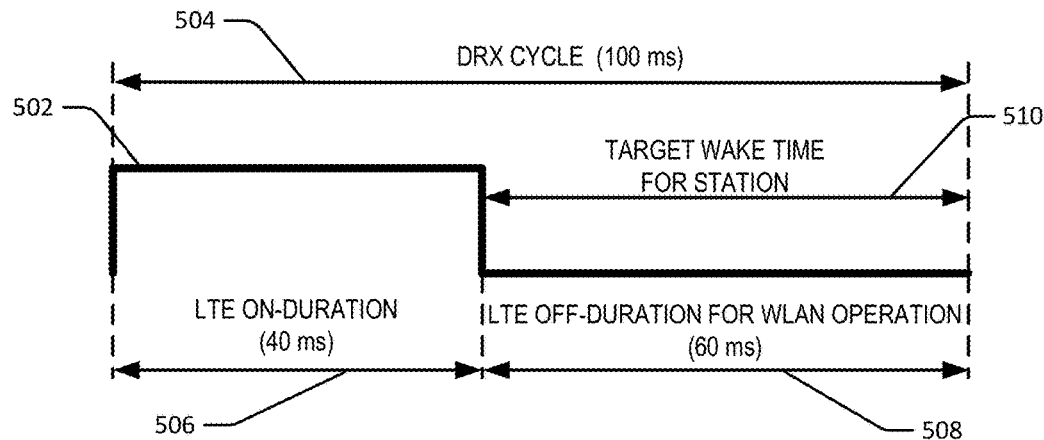
FIG. 5 illustrates an example of timing for a target wake time.
Figure 6:
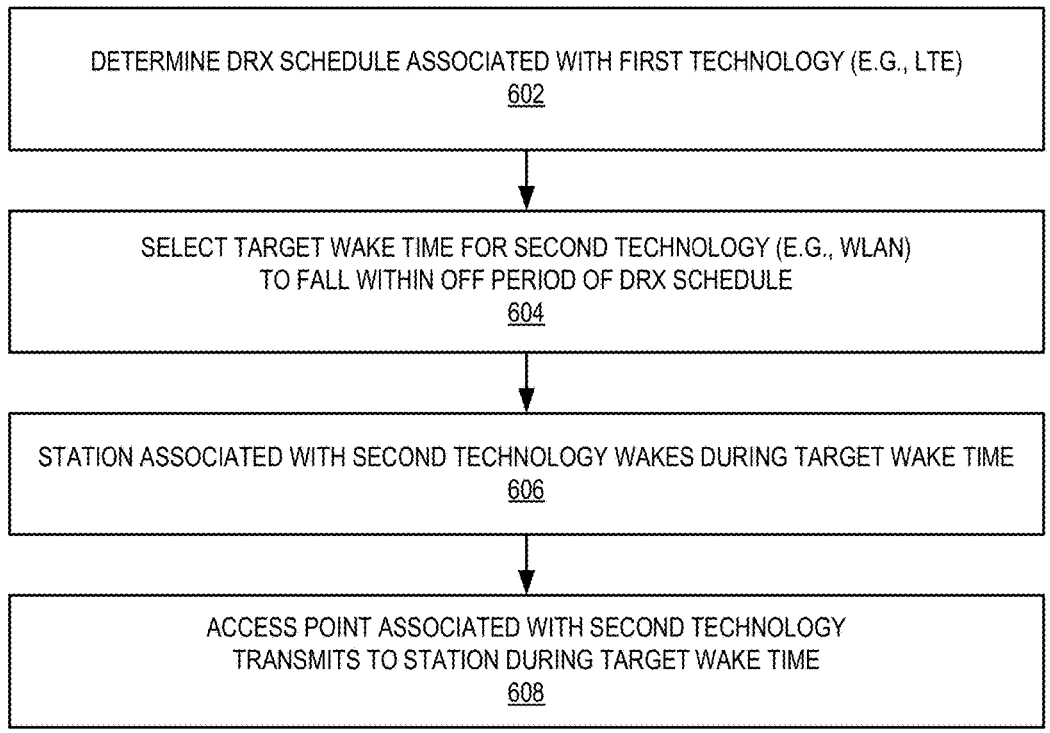
FIG. 6 is a flowchart of several sample aspects of operations relating to selecting a target wake time.

FIGS. 5 and 6 relate to the use of a target wake time. In 802.11ah, a station may agree with a serving access point on a (periodic) time at which the station will be awake for at least a minimum amount of time. Thus, the access point is able to send data to the station during this target wake time.

A target wake time may be requested by a station and granted (optionally modified) by an access point. If a station does not receive any traffic during the target wake time, the station can go back to sleep (e.g., transition back to a low power state). If a station does receive traffic during the target wake time, the station can remain awake to complete the traffic exchange.

As mentioned above, for those technologies that employ DRX, an apparatus associated with such a technology (e.g., LTE) could desensitize a nearby 802.11ah receiver or vice versa.

In accordance with the teachings herein, a target wake time may be utilized such that an 802.11ah station will only wake for data when the apparatuses associated with the other technology (e.g., LTE) are not transmitting or receiving. In particular, the 802.11ah station may wake during a DRX-OFF period. By restricting stations to only wake for data during the DRX-OFF period, interference with the technology that employs the DRX may be avoided.

For an apparatus that embodies (e.g., comprises, includes, takes the form of, etc.) a station, the apparatus may make a request to an access point to use a target wake time that ensures that the access point will only send downlink data during a DRX-OFF period.

For an apparatus that embodies an access point, the apparatus may set or modify the target wake time to ensure that the access point will only send downlink data during a DRX-OFF period.

FIG. 5 illustrates an example of a target wake time that is defined within a DRX cycle 502. In this example, the total duration 504, the on-duration 506, and the off-duration 508 of the DRX cycle 502 are the same as in FIG. 3. These durations may have values different from the values shown in FIG. 5 in different implementations.

As indicated by the target wake time period 510, a target wake time defined for WLAN operation will be specified to occur within the DRX off-duration 508.

FIG. 6 illustrates an example of operations that may be employed to select a target wake time. One or more of these operations may be performed by an access point, an access terminal, or some other suitable apparatus.

As represented by block 602, a DRX schedule associated with a first technology is determined. For example, an 802.11ah device may receive information about the DRX cycle used by a co-located LTE device.

As represented by block 604, a target wake time for a second technology is selected such that the target wake time falls within an off period of the DRX schedule. For example, a target wake time may be defined as shown in FIG. 5.

As represented by block 606, a station associated with the second technology will then wake according to the designated target wake time. Accordingly, as represented by block 608, an access point associated with the second technology will transmit to the station during this time, assuming there is data to send.

Figure 7:
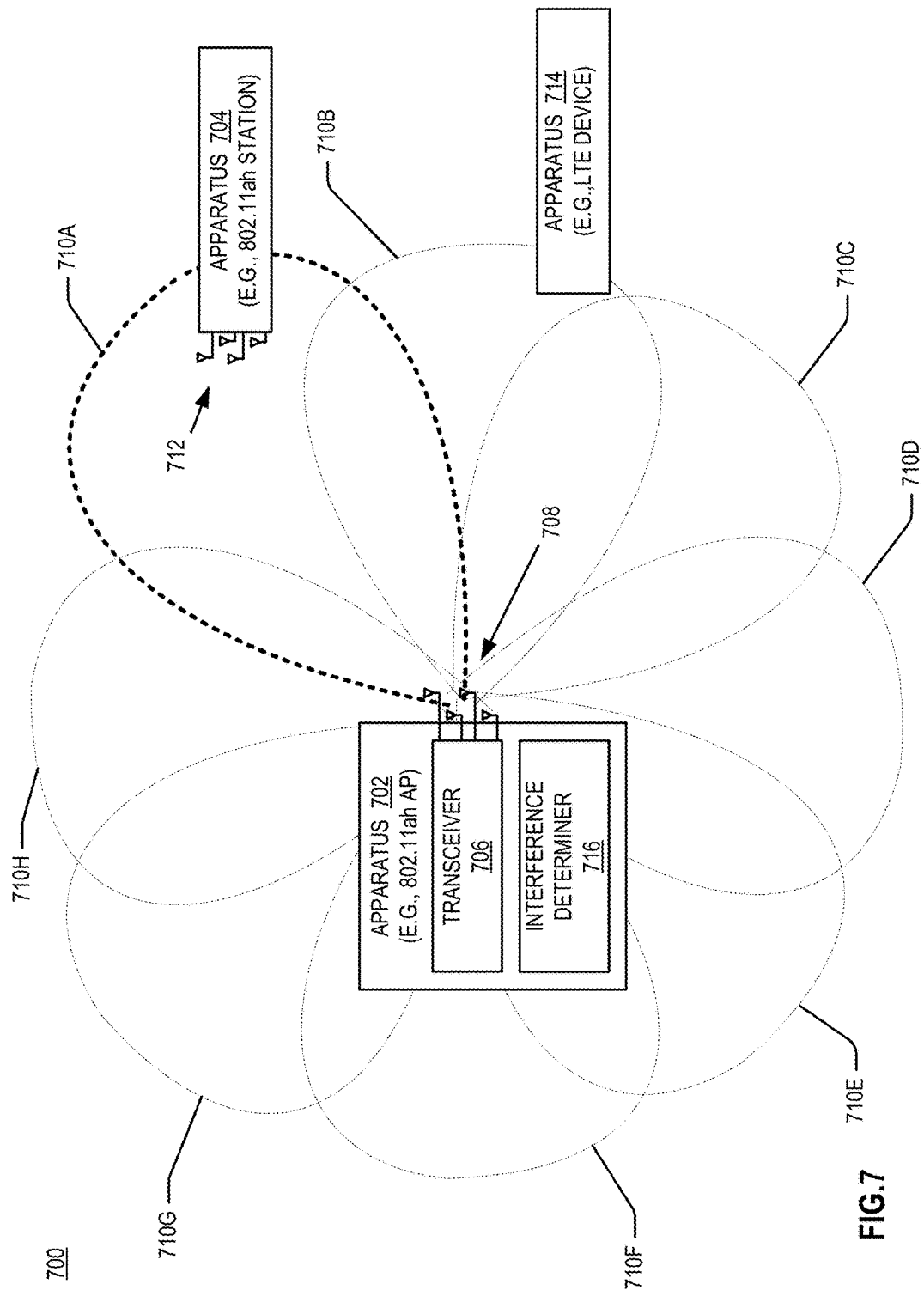
FIG. 7 illustrates an example of selecting a directional antenna sector.
Figure 8:
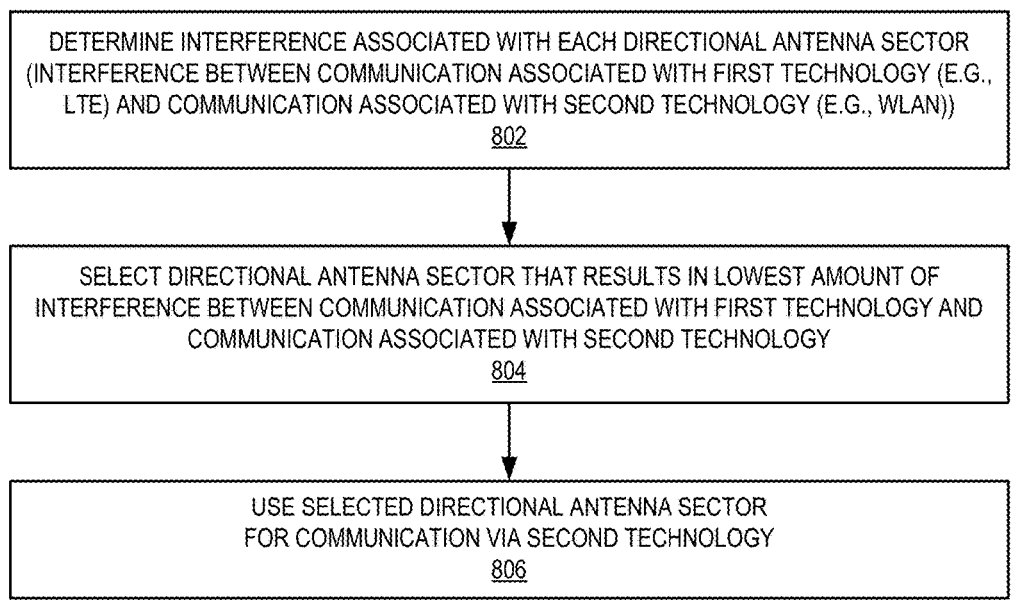
FIG. 8 is a flowchart of several sample aspects of operations relating to selecting a directional antenna sector.

FIGS. 7 and 8 relate to the use of directional antenna sectors. 802.11ah defines a protocol for operation with an access point that uses sectorized antennas. Thus, in some aspects, this implementation involves a sectorized basic service set (BSS).

To facilitate co-existence with another technology, the directional antenna sector that results in the least amount of interference between the technologies is selected. Typically, this interference determination is made when traffic is being carried by at least one of the technologies. For example, interference detection techniques such as packet loss, frame error rate, etc., may be employed to identify and/or quantify interference. As another example, channel conditions such as RSSI and SNR may be used to identify and/or quantify interference. The interference referred to herein will involve current interference in some cases and potential interference in some cases. As an example of the former scenario, an apparatus may determine (e.g., measure) the amount of interference it is receiving while the apparatus is attempting to receive data. As an example of the latter scenario, an apparatus may determine (e.g., estimate) the amount of interference it expects to receive during future receive operations. Such an estimate may be based, for example, on signals that were previously received during scheduled receive timeslots.

For an apparatus that embodies an access point, the apparatus may select the sector to have minimum co-existence issues with the other technology. That is, for the transmit chain of the apparatus, the sector that results in the lowest amount of interference on the receiver for the other technology is selected. For the receive chain of the apparatus, the sector that results in the lowest amount of interference (from the other technology) on the receive chain is selected.

Similarly, for an apparatus that embodies a station, the apparatus may request its access point to send data using the sector that has minimum co-existence issues with the other technology.

FIG. 7 illustrates sample aspects of a communication system 700 where an apparatus 702 communicates with an apparatus 704. The apparatus 702 includes a transceiver 706 that cooperates with an antenna system 708 (e.g., an antenna array) to generate directional beam patterns. Examples of directional beam patterns 710A-710H that the apparatus 702 may generate are represented in a simplified form in FIG. 7 by the corresponding dashed line symbols. In practice, the apparatus 702 will generally use different beam patterns for signal transmission versus signal reception. Only one set of beam patterns is shown, however, to reduce the complexity of FIG. 7.

The apparatus 704 may include a similar transceiver (not shown) and antenna system 712 to generate directional beam patterns. To reduce the complexity of FIG. 7, the beams patterns for the apparatus 704 are not shown. In some implementations, the apparatuses comprise IEEE 802.11ah devices. It should be appreciated, however, that the teachings herein may be applied to other types of communication technologies.

To facilitate co-existence with another apparatus 714 that uses another technology (e.g., LTE), the apparatus 702 and/or another apparatus in the system includes an interference determiner 716 to determine the interference between the different technologies. The apparatuses 702 and 704 may thus cooperate to select the beam pattern (for either a transmit or receive operation) that provides the lowest interference with respect to the other technology. In the simplified example of FIG. 7, the apparatus 702 selects the beam pattern 710A to communicate with the apparatus 704.

FIG. 8 illustrates an example of operations that may be employed to select a directional antenna sector. One or more of these operations may be performed by an access point, an access terminal, or some other suitable apparatus.

As represented by block 802, the interference associated with each directional antenna sector is determined. For example, the amount of interference that results from the use of each direction antenna sector is determined. As mentioned above, the interference of interest is the interference between communication associated with a first technology and communication associated with a second technology.

Also, an interference determination may be made with respect to receive operations for each technology.

As represented by block 804, the directional antenna sector that is associated with (e.g., that results in) the lowest amount of interference is selected. In some cases, different directional antenna sectors will be selected for transmit and receive operations (with respect to the second technology).

As represented by block 806, the selected directional antenna sector is (or sectors are) used for communication via the second technology (e.g., 802.11ah).

Figure 9:
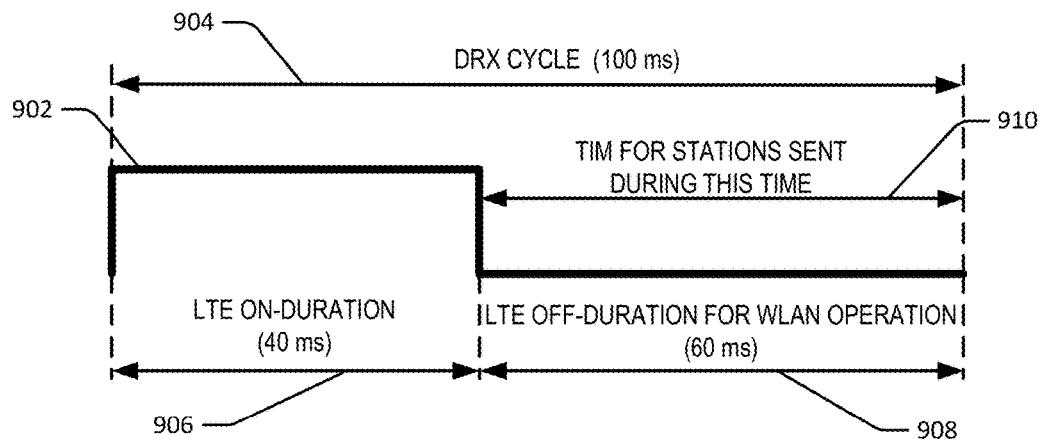
FIG. 9 illustrates an example of timing for transmission of a traffic indication map.
Figure 10:
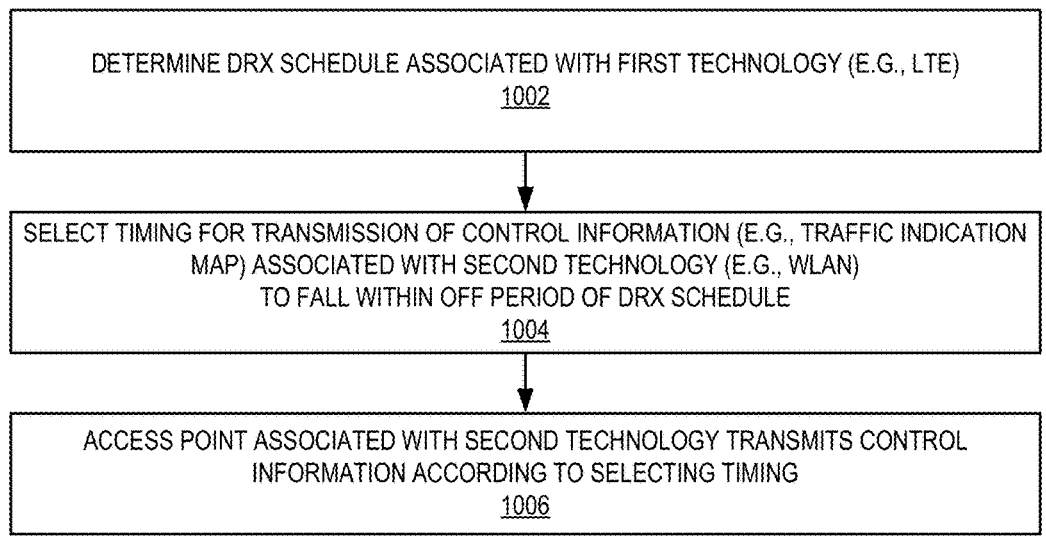
FIG. 10 is a flowchart of several sample aspects of operations relating to selecting timing for transmission of control information.

FIGS. 9 and 10 relate to scheduling the transmission of control information to support co-existence between technologies. This control information may comprise, for example, a traffic indication map (TIM) that indicates whether an access point has buffered frames destined for any of its stations. In 802.11ah, TIMs may be sent to a station (or a group of stations) at a defined scheduled time.

In accordance with the teachings herein, control information such as a TIM may be scheduled such that an 802.11ah access point with only send control information to a station when the apparatuses associated with another technology (e.g., LTE) are not transmitting or receiving. For example, an access point may transmit control information during a DRX-OFF period. By restricting the transmission of control information to only occur during the DRX-OFF period, interference with the technology that employs the DRX may be avoided.

FIG. 9 illustrates an example of a TIM schedule that is defined within a DRX cycle 902. In this example, the total duration 904, the on-duration 906, and the off-duration 908 of the DRX cycle 902 are the same as in FIG. 3. These durations may have values different from the values shown in FIG. 9 in different implementations.

As indicated by the TIM time period 910, a TIM defined for WLAN operations will be schedule for transmission within the DRX off-duration 908.

FIG. 10 illustrates an example of operations that may be employed to select a schedule for the transmission of control information. One or more of these operations may be performed by an access point, an access terminal, or some other suitable apparatus.

As represented by block 1002, a DRX schedule associated with a first technology is determined. For example, an 802.11ah device may receive information about the DRX cycle as discussed herein.

As represented by block 1004, timing for transmission of control information associated with a second technology is selected such that the transmission falls within an off period of the DRX schedule. For example, a TIM may be scheduled as shown in FIG. 9.

As represented by block 1006, an access point associated with the second technology will then transmit the control information according to the selected timing. In addition, any stations served by the access point will monitor for (e.g., wake up for) the control information at this time.

Figure 11:
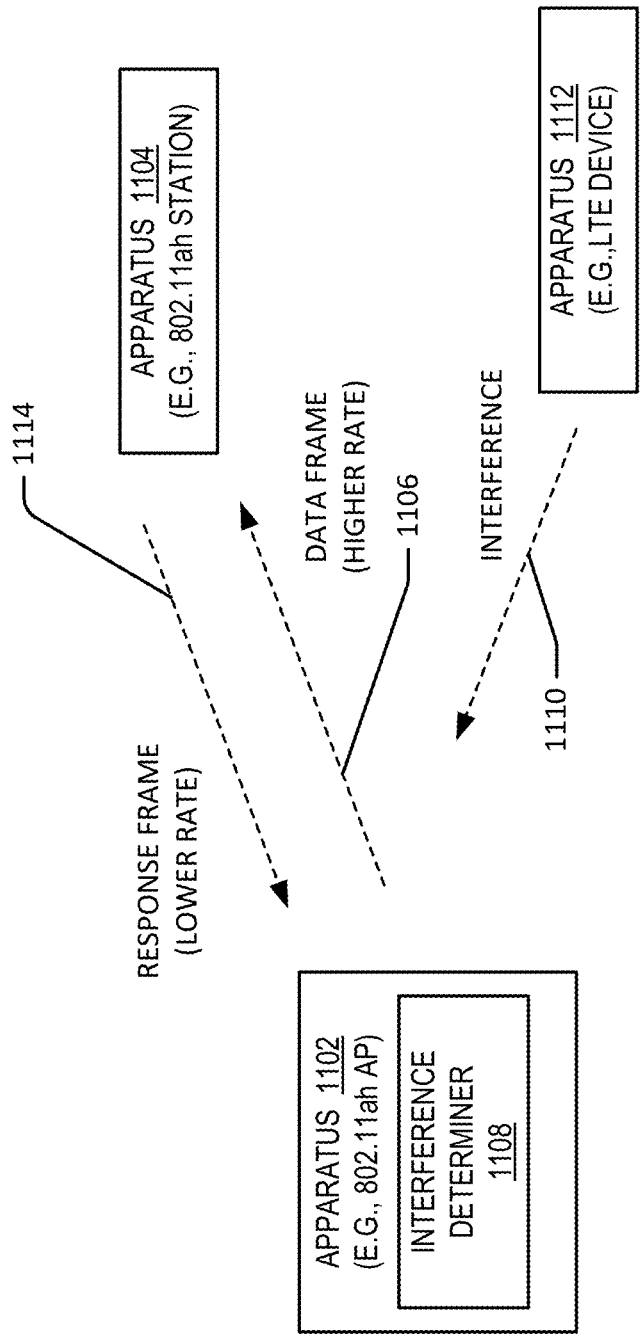
FIG. 11 illustrates an example of selecting a lower rate for a response frame.
Figure 12:
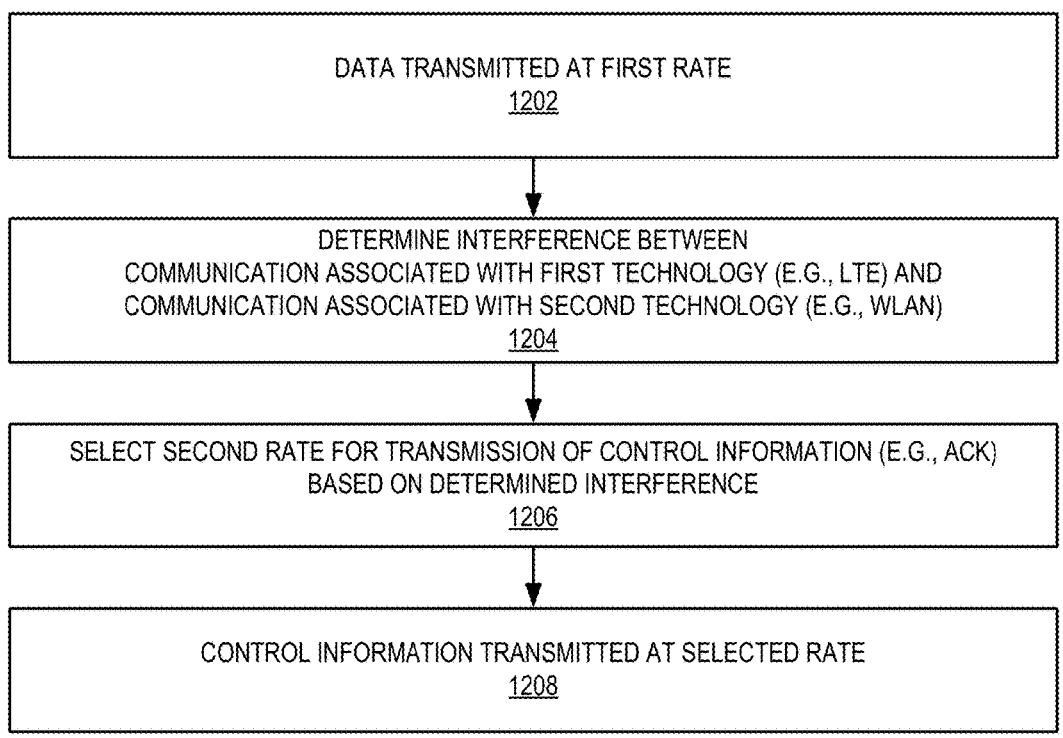
FIG. 12 is a flowchart of several sample aspects of operations relating to selecting a rate for transmission of control information.

FIGS. 11 and 12 relate to the use of rate selection to mitigate co-existence issues. Conventionally, control response frames (e.g., ACKs) are sent using a modulation and coding scheme (MCS) that is dependent on the MCS used for the corresponding request frame. However, when a local apparatus has co-existence issues due to transmissions by an apparatus associated with another technology (e.g., LTE), a control response frame may not be received properly if the request frame (and, hence, the control response frame) is sent using a high MCS.

In accordance with the teachings herein, the rate (e.g., MCS) for sending control information such as control response frames is selected based on the local apparatus co-existence situation. 802.11ah defines an indication that enables a transmitter and a receiver to agree on a rate to be used for response control frames.

In some aspects, the rate selected for the transmission of control information is based on interference-related parameters. Examples of these parameter include RSSI seen at the WLAN device, SNR seen at the WLAN device, the transmit power used by the transmitter associated with the other technology (e.g., LTE), the transmit power of the transmitter as measured at the WLAN device, or the transmit frequency used by the transmitter associated with the other technology. Also, interference detection techniques such as packet loss, frame error rate, etc., may be employed to identify and/or quantify interference.

FIG. 11 illustrates sample aspects of a communication system where an apparatus 1102 transmits data to an apparatus 1104 via a first technology (e.g., 802.11ah). As indicated in the figure, the apparatus 1102 transmit data frames 1106 at a relatively high rate. The apparatus 1102 or some other suitable apparatus includes an interference determiner 1108 that determines whether the receive chain (not shown) at the apparatus 1102 is subject to interference 1110 from an apparatus 1112 associated with a different technology (e.g., LTE). If interference is present (e.g., exceeds a defined threshold), the apparatuses 1102 and 1104 cooperate to define a lower rate for the transmission of the response frame 1114.

FIG. 12 illustrates an example of operations that may be employed to provide rate selection for control information. One or more of these operations may be performed by an access point, an access terminal, or some other suitable apparatus.

As represented by block 1202, data is transmitted at a first rate (e.g., according to a first MCS). This transmission occurs via a second technology (e.g., 802.11ah).

As represented by block 1204, the interference between communication associated with the first technology and communication associated with a second technology is determined. For example, the apparatus that transmitted the data at block 1202 may determine whether it is receiving interference from an apparatus that uses the first technology (e.g., LTE).

As represented by block 1206, based on the determination of block 1204, a rate (e.g., MCS) for transmission of control information is selected. For example, the rate that is associated with (e.g., that results in) the lowest amount of interference may be selected here. As discussed above, the apparatuses associated with the second technology may communicate this rate information so that the transmitter and receiver will be using the same rate for the control information.

As represented by block 1208, the control information is transmitted at the rate selected at block 1206. For example, the apparatus that received the data transmitted at block 1202 may transmit an ACK.

With the above in mind, various aspects of a wireless local area network will be described in more detail in conjunction with FIGS. 13-16. Wireless network technologies may include various types of wireless local area networks (WLANs). A WLAN may be used to interconnect nearby devices together, employing widely used networking protocols. The various aspects described herein may apply to any communication standard, such as Wi-Fi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communication, a combination of OFDM and DSSS communication, or other schemes.

Certain of the devices described herein may further implement Multiple Input Multiple Output (MIMO) technology and be implemented as part of an 802.11 protocol. A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels or streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices that access the wireless network. For example, there may be two types of devices: access points (APs) and clients (also referred to as stations, or STAs). In general, an AP serves as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

An access point (AP) may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, or some other terminology.

A station (STA) may also comprise, be implemented as, or known as an access terminal (AT), a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Figure 13:
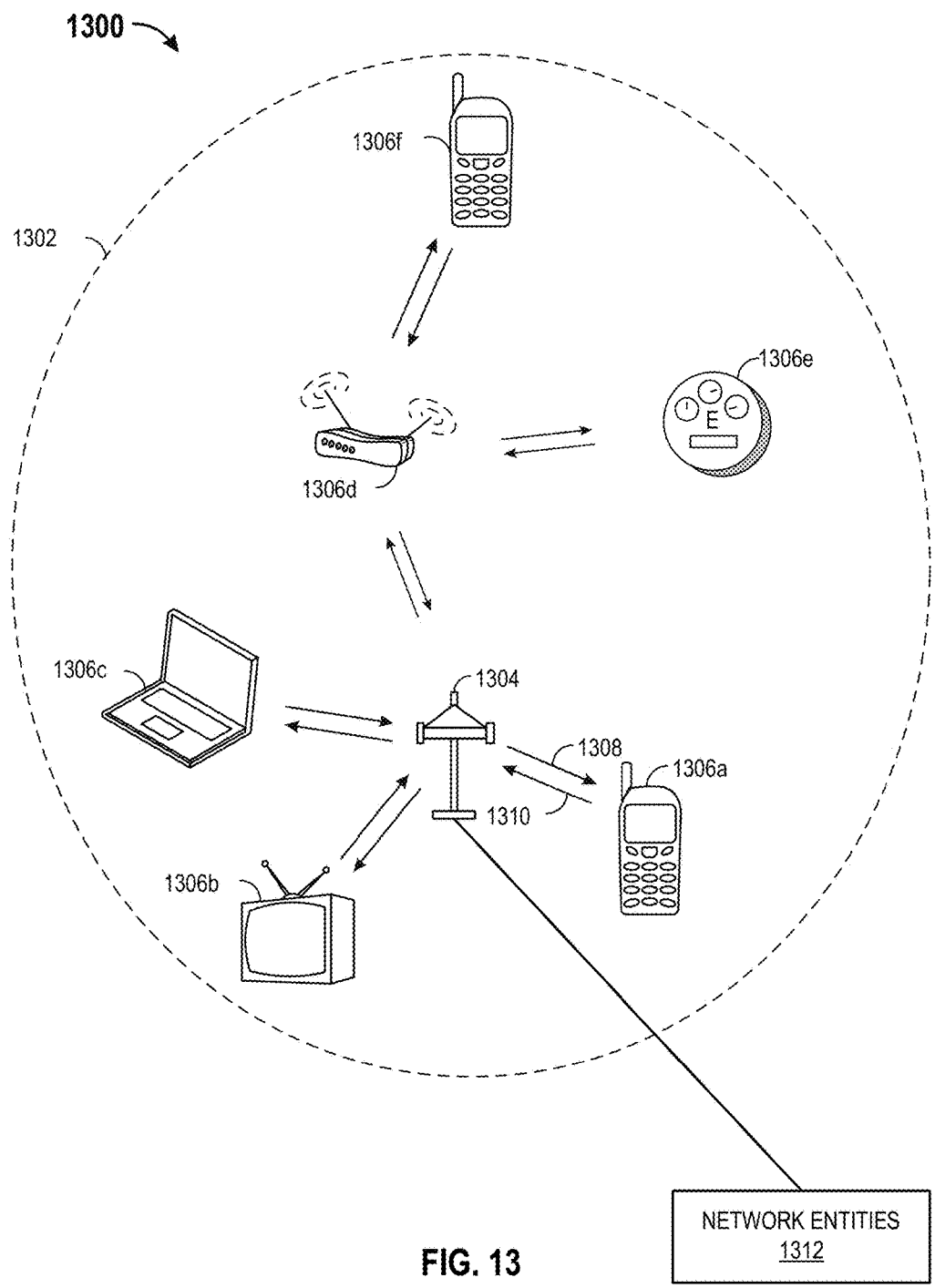
FIG. 13 illustrates an example of a wireless communication system in which aspects of the present disclosure may be employed.

FIG. 13 illustrates an example of a wireless communication system 1300 in which aspects of the present disclosure may be employed. The wireless communication system 1300 may operate pursuant to a wireless standard, for example the 802.11 standard. The wireless communication system 1300 may include an AP 1304, which communicates with STAs 1306a, 1306b, 1306c, 1306d, 1306e, and 1306f (collectively STAs 1306).

STAs 1306e and 1306f may have difficulty communicating with the AP 1304 or may be out of range and unable to communicate with the AP 1304. As such, another STA 1306d may be configured as a relay device (e.g., a device comprising STA and AP functionality) that relays communication between the AP 1304 and the STAs 1306e and 1306f.

A variety of processes and methods may be used for transmission in the wireless communication system 1300 between the AP 1304 and the STAs 1306. For example, signals may be sent and received between the AP 1304 and the STAs 1306 in accordance with OFDM/OFDMA techniques. If this is the case, the wireless communication system 1300 may be referred to as an OFDM/OFDMA system. Alternatively, signals may be sent and received between the AP 1304 and the STAs 1306 in accordance with CDMA techniques. If this is the case, the wireless communication system 1300 may be referred to as a CDMA system.

A communication link that facilitates transmission from the AP 1304 to one or more of the STAs 1306 may be referred to as a downlink (DL) 1308, and a communication link that facilitates transmission from one or more of the STAs 1306 to the AP 1304 may be referred to as an uplink (UL) 1310. Alternatively, a downlink 1308 may be referred to as a forward link or a forward channel, and an uplink 1310 may be referred to as a reverse link or a reverse channel.

The AP 1304 may act as a base station and provide wireless communication coverage in a basic service area (BSA) 1302. The AP 1304 along with the STAs 1306 associated with the AP 1304 and that use the AP 1304 for communication may be referred to as a basic service set (BSS).

Access points may thus be deployed in a communication network to provide access to one or more services (e.g., network connectivity) for one or more access terminals that may be installed within or that may roam throughout a coverage area of the network. For example, at various points in time an access terminal may connect to the AP 1304 or to some other access point in the network (not shown).

Each of the access points may communicate with one or more network entities (represented, for convenience, by network entities 1312 in FIG. 13), including each other, to facilitate wide area network connectivity. A network entity may take various forms such as, for example, one or more radio and/or core network entities. Thus, in various implementations the network entities 1312 may represent functionality such as at least one of: network management (e.g., via an authentication, authorization, and accounting (AAA) server), session management, mobility management, gateway functions, interworking functions, database functionality, or some other suitable network functionality. Two or more of such network entities may be co-located and/or two or more of such network entities may be distributed throughout a network.

It should be noted that in some implementations the wireless communication system 1300 may not have a central AP 1304, but rather may function as a peer-to-peer network between the STAs 1306. Accordingly, the functions of the AP 1304 described herein may alternatively be performed by one or more of the STAs 1306. Also, as mentioned above, a relay may incorporate at least some of the functionality of an AP and a STA.

Figure 14:
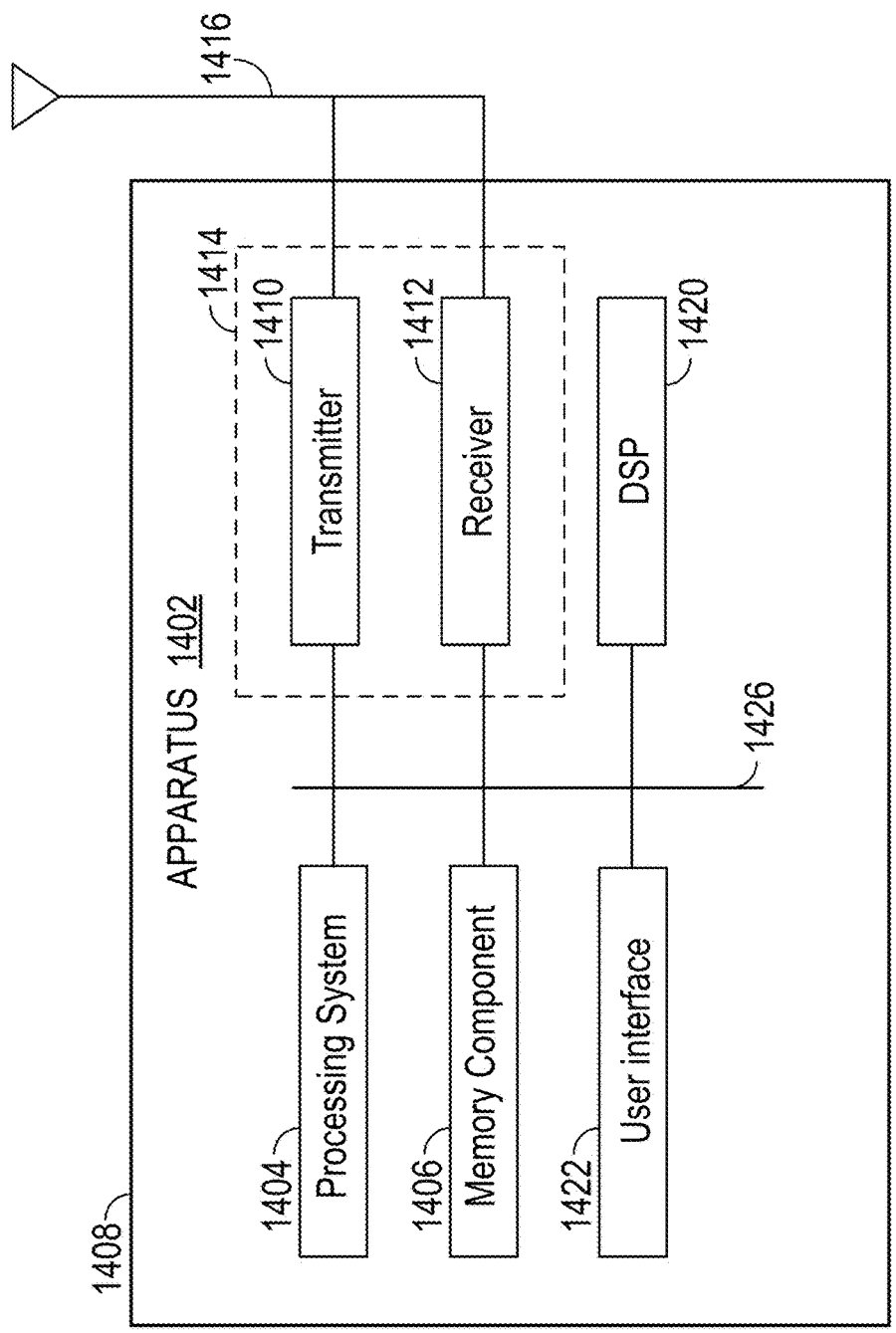
FIG. 14 shows a functional block diagram of an exemplary apparatus that may be employed within a wireless communication system.

FIG. 14 illustrates various components that may be utilized in an apparatus 1402 (e.g., a wireless device) that may be employed within the wireless communication system 1300. The apparatus 1402 is an example of a device that may be configured to implement the various methods described herein. For example, the apparatus 1402 may comprise the AP 1304, a relay 1306*d*, or one of the STAs 1306 of FIG. 13.

The apparatus 1402 may include a processing system 1404 that controls operation of the apparatus 1402. The processing system 1404 may also be referred to as a central processing unit (CPU). A memory component 1406 (e.g., including a memory device), which may include both read-only memory (ROM) and random access memory (RAM), provides instructions and data to the processing system 1404. A portion of the memory component 1406 may also include non-volatile random access memory (NVRAM). The processing system 1404 typically performs logical and arithmetic operations based on program instructions stored within the memory component 1406. The instructions in the memory component 1406 may be executable to implement the methods described herein.

When the apparatus 1402 is implemented or used as a transmitting node, the processing system 1404 may be configured to select one of a plurality of media access control (MAC) header types, and to generate a packet having that MAC header type. For example, the processing system 1404 may be configured to generate a packet comprising a MAC header and a payload and to determine what type of MAC header to use.

When the apparatus 1402 is implemented or used as a receiving node, the processing system 1404 may be configured to process packets of a plurality of different MAC header types. For example, the processing system 1404 may be configured to determine the type of MAC header used in a packet and process the packet and/or fields of the MAC header.

The processing system 1404 may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The apparatus 1402 may also include a housing 1408 that may include a transmitter 1410 and a receiver 1412 to allow transmission and reception of data between the apparatus 1402 and a remote location. The transmitter 1410 and receiver 1412 may be combined into single communication device (e.g., a transceiver 1414). An antenna 1416 may be attached to the housing 1408 and electrically coupled to the transceiver 1414. The apparatus 1402 may also include (not shown) multiple transmitters, multiple receivers, multiple transceivers, and/or multiple antennas. A transmitter 1410 and a receiver 1412 may comprise an integrated device (e.g., embodied as a transmitter circuit and a receiver circuit of a single communication device) in some implementations, may comprise a separate transmitter device and a separate receiver device in some implementations, or may be embodied in other ways in other implementations.

The transmitter 1410 may be configured to wirelessly transmit packets having different MAC header types. For example, the transmitter 1410 may be configured to transmit packets with different types of headers generated by the processing system 1404, discussed above.

The receiver 1412 may be configured to wirelessly receive packets having different MAC header type. In some aspects, the receiver 1412 is configured to detect a type of a MAC header used and process the packet accordingly.

The receiver 1412 may be used to detect and quantify the level of signals received by the transceiver 1414. The receiver 1412 may detect such signals as total energy, energy per subcarrier per symbol, power spectral density and other signals. The apparatus 1402 may also include a digital signal processor (DSP) 1420 for use in processing signals. The DSP 1420 may be configured to generate a data unit for transmission. In some aspects, the data unit may comprise a physical layer data unit (PPDU). In some aspects, the PPDU is referred to as a packet.

The apparatus 1402 may further comprise a user interface 1422 in some aspects. The user interface 1422 may comprise a keypad, a microphone, a speaker, and/or a display. The user interface 1422 may include any element or component that conveys information to a user of the apparatus 1402 and/or receives input from the user.

The various components of the apparatus 1402 may be coupled together by a bus system 1426. The bus system 1426 may include a data bus, for example, as well as a power bus, a control signal bus, and a status signal bus in addition to the data bus. Those of skill in the art will appreciate the components of the apparatus 1402 may be coupled together or accept or provide inputs to each other using some other mechanism.

Although a number of separate components are illustrated in FIG. 14, one or more of the components may be combined or commonly implemented. For example, the processing system 1404 may be used to implement not only the functionality described above with respect to the processing system 1404, but also to implement the functionality described above with respect to the transceiver 1414 and/or the DSP 1420. Further, each of the components illustrated in FIG. 14 may be implemented using a plurality of separate elements. Furthermore, the processing system 1404 may be used to implement any of the components, modules, circuits, or the like described below, or each may be implemented using a plurality of separate elements.

For ease of reference, when the apparatus 1402 is configured as a transmitting node, it is hereinafter referred to as an apparatus 1402*t*. Similarly, when the apparatus 1402 is configured as a receiving node, it is hereinafter referred to as an apparatus 1402*r*. A device in the wireless communication system 1300 may implement only functionality of a transmitting node, only functionality of a receiving node, or functionality of both a transmitting node and a receive node.

As discussed above, the apparatus 1402 may comprise an AP 1304 or a STA 1306, and may be used to transmit and/or receive communication having a plurality of MAC header types.

The components of FIG. 14 may be implemented in various ways. In some implementations, the components of FIG. 14 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks of FIG. 14 may be implemented by processor and memory component(s) of the apparatus (e.g., by execution of appropriate code and/or by appropriate configuration of processor components). It should be appreciated that these components may be implemented in different types of apparatuses in different implementations (e.g., in an ASIC, in a system-on-a-chip (SoC), etc.).

Figure 15:
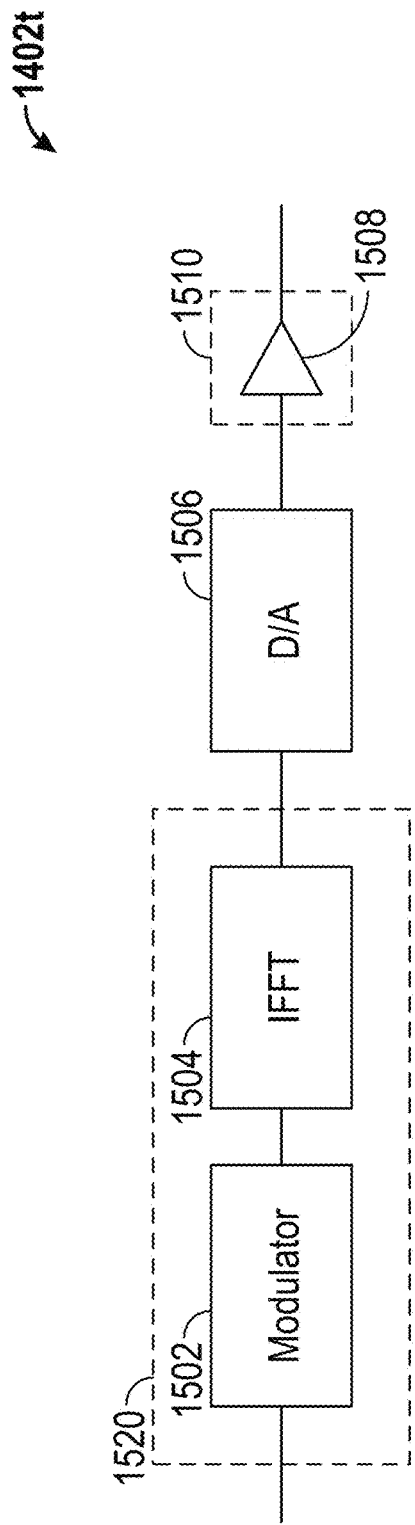
FIG. 15 shows a functional block diagram of exemplary components that may be utilized in the apparatus of FIG. 14 to transmit wireless communication.

As discussed above, the apparatus 1402 may comprise an AP 1304 or a STA 1306, and may be used to transmit and/or receive communication. FIG. 15 illustrates various components that may be utilized in the apparatus 1402*t* to transmit wireless communication. The components illustrated in FIG. 15 may be used, for example, to transmit OFDM communication. In some aspects, the components illustrated in FIG. 15 are used to generate and transmit packets to be sent over a bandwidth of less than or equal to 1 MHz.

The apparatus 1402*t* of FIG. 15 may comprise a modulator 1502 configured to modulate bits for transmission. For example, the modulator 1502 may determine a plurality of symbols from bits received from the processing system 1404 (FIG. 14) or the user interface 1422 (FIG. 14), for example by mapping bits to a plurality of symbols according to a constellation. The bits may correspond to user data or to control information. In some aspects, the bits are received in codewords. In one aspect, the modulator 1502 comprises a QAM (quadrature amplitude modulation) modulator, for example a 16-QAM modulator or a 64-QAM modulator. In other aspects, the modulator 1502 comprises a binary phase-shift keying (BPSK) modulator or a quadrature phase-shift keying (QPSK) modulator.

The apparatus 1402*t* may further comprise a transform module 1504 configured to convert symbols or otherwise modulated bits from the modulator 1502 into a time domain. In FIG. 15, the transform module 1504 is illustrated as being implemented by an inverse fast Fourier transform (IFFT) module. In some implementations, there may be multiple transform modules (not shown) that transform units of data of different sizes. In some implementations, the transform module 1504 may be itself configured to transform units of data of different sizes. For example, the transform module 1504 may be configured with a plurality of modes, and may use a different number of points to convert the symbols in each mode. For example, the IFFT may have a mode where 32 points are used to convert symbols being transmitted over 32 tones (i.e., subcarriers) into a time domain, and a mode where 64 points are used to convert symbols being transmitted over 64 tones into a time domain. The number of points used by the transform module 1504 may be referred to as the size of the transform module 1504.

In FIG. 15, the modulator 1502 and the transform module 1504 are illustrated as being implemented in the DSP 1520. In some aspects, however, one or both of the modulator 1502 and the transform module 1504 are implemented in the processing system 1404 or in another element of the apparatus 1402*t* (e.g., see description above with reference to FIG. 14).

As discussed above, the DSP 1520 may be configured to generate a data unit for transmission. In some aspects, the modulator 1502 and the transform module 1504 may be configured to generate a data unit comprising a plurality of fields including control information and a plurality of data symbols.

Returning to the description of FIG. 15, the apparatus 1402*t* may further comprise a digital to analog converter 1506 configured to convert the output of the transform module into an analog signal. For example, the time-domain output of the transform module 1506 may be converted to a baseband OFDM signal by the digital to analog converter 1506. The digital to analog converter 1506 may be implemented in the processing system 1404 or in another element of the apparatus 1402 of FIG. 14. In some aspects, the digital to analog converter 1506 is implemented in the transceiver 1414 (FIG. 14) or in a data transmit processor.

The analog signal may be wirelessly transmitted by the transmitter 1510. The analog signal may be further processed before being transmitted by the transmitter 1510, for example by being filtered or by being upconverted to an intermediate or carrier frequency. In the aspect illustrated in FIG. 15, the transmitter 1510 includes a transmit amplifier 1508. Prior to being transmitted, the analog signal may be amplified by the transmit amplifier 1508. In some aspects, the amplifier 1508 comprises a low noise amplifier (LNA).

The transmitter 1510 is configured to transmit one or more packets or data units in a wireless signal based on the analog signal. The data units may be generated using the processing system 1404 (FIG. 14) and/or the DSP 1520, for example using the modulator 1502 and the transform module 1504 as discussed above. Data units that may be generated and transmitted as discussed above are described in additional detail below.

Figure 16:
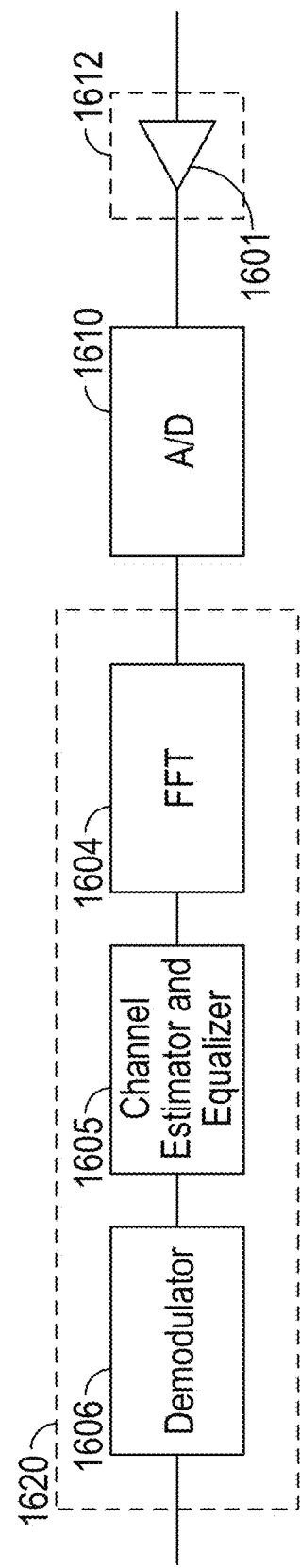
FIG. 16 shows a functional block diagram of exemplary components that may be utilized in the apparatus of FIG. 14 to receive wireless communication.

FIG. 16 illustrates various components that may be utilized in the apparatus 1402 of FIG. 14 to receive wireless communication. The components illustrated in FIG. 16 may be used, for example, to receive OFDM communication. For example, the components illustrated in FIG. 16 may be used to receive data units transmitted by the components discussed above with respect to FIG. 15.

The receiver 1612 of apparatus 1402*r* is configured to receive one or more packets or data units in a wireless signal. Data units that may be received and decoded or otherwise processed as discussed below.

In the aspect illustrated in FIG. 16, the receiver 1612 includes a receive amplifier 1601. The receive amplifier 1601 may be configured to amplify the wireless signal received by the receiver 1612. In some aspects, the receiver 1612 is configured to adjust the gain of the receive amplifier 1601 using an automatic gain control (AGC) procedure. In some aspects, the automatic gain control uses information in one or more received training fields, such as a received short training field (STF) for example, to adjust the gain. Those having ordinary skill in the art will understand methods for performing AGC. In some aspects, the amplifier 1601 comprises an LNA.

The apparatus 1402*r* may comprise an analog to digital converter 1610 configured to convert the amplified wireless signal from the receiver 1612 into a digital representation thereof. Further to being amplified, the wireless signal may be processed before being converted by the digital to analog converter 1610, for example by being filtered or by being downconverted to an intermediate or baseband frequency. The analog to digital converter 1610 may be implemented in the processing system 1404 (FIG. 14) or in another element of the apparatus 1402*r*. In some aspects, the analog to digital converter 1610 is implemented in the transceiver 1414 (FIG. 14) or in a data receive processor.

The apparatus 1402*r* may further comprise a transform module 1604 configured to convert the representation of the wireless signal into a frequency spectrum. In FIG. 16, the transform module 1604 is illustrated as being implemented by a fast Fourier transform (FFT) module. In some aspects, the transform module may identify a symbol for each point that it uses. As described above with reference to FIG. 15, the transform module 1604 may be configured with a plurality of modes, and may use a different number of points to convert the signal in each mode. The number of points used by the transform module 1604 may be referred to as the size of the transform module 1604. In some aspects, the transform module 1604 may identify a symbol for each point that it uses.

The apparatus 1402r may further comprise a channel estimator and equalizer 1605 configured to form an estimate of the channel over which the data unit is received, and to remove certain effects of the channel based on the channel estimate. For example, the channel estimator 1605 may be configured to approximate a function of the channel, and the channel equalizer may be configured to apply an inverse of that function to the data in the frequency spectrum.

The apparatus 1402r may further comprise a demodulator 1606 configured to demodulate the equalized data. For example, the demodulator 1606 may determine a plurality of bits from symbols output by the transform module 1604 and the channel estimator and equalizer 1605, for example by reversing a mapping of bits to a symbol in a constellation. The bits may be processed or evaluated by the processing system 1404 (FIG. 14), or used to display or otherwise output information to the user interface 1422 (FIG. 14). In this way, data and/or information may be decoded. In some aspects, the bits correspond to codewords. In one aspect, the demodulator 1606 comprises a QAM (quadrature amplitude modulation) demodulator, for example a 16-QAM demodulator or a 64-QAM demodulator. In other aspects, the demodulator 1606 comprises a binary phase-shift keying (BPSK) demodulator or a quadrature phase-shift keying (QPSK) demodulator.

In FIG. 16, the transform module 1604, the channel estimator and equalizer 1605, and the demodulator 1606 are illustrated as being implemented in the DSP 1620. In some aspects, however, one or more of the transform module 1604, the channel estimator and equalizer 1605, and the demodulator 1606 are implemented in the processing system 1404 (FIG. 14) or in another element of the apparatus 1402 (FIG. 14).

As discussed above, the wireless signal received at the receiver 1412 comprises one or more data units. Using the functions or components described above, the data units or data symbols therein may be decoded evaluated or otherwise evaluated or processed. For example, the processing system 1404 (FIG. 14) and/or the DSP 1620 may be used to decode data symbols in the data units using the transform module 1604, the channel estimator and equalizer 1605, and the demodulator 1606.

Data units exchanged by the AP 1304 and the STA 1306 may include control information or data, as discussed above. At the physical (PHY) layer, these data units may be referred to as physical layer protocol data units (PPDUs). In some aspects, a PPDU may be referred to as a packet or physical layer packet. Each PPDU may comprise a preamble and a payload. The preamble may include training fields and a SIG field. The payload may comprise a Media Access Control (MAC) header or data for other layers, and/or user data, for example. The payload may be transmitted using one or more data symbols. The systems, methods, and devices herein may utilize data units with training fields whose peak-to-power ratio has been minimized.

The apparatus 1402t shown in FIG. 15 shows an example of a single transmit chain for transmitting over an antenna. The apparatus 1402r shown in FIG. 16 shows an example of a single receive chain for receiving over an antenna. In some implementations, the apparatus 1402t or 1402r may implement a portion of a MIMO system using multiple antennas to simultaneously transmit data.

The wireless network 1300 may employ methods to allow efficient access of the wireless medium based on unpredictable data transmission while avoiding collisions. As such, in accordance with various aspects, the wireless network 1300 performs carrier sense multiple access/collision avoidance (CSMA/CA) that may be referred to as the Distributed Coordination Function (DCF). More generally, an apparatus 1402 having data for transmission senses the wireless medium to determine if the channel is already occupied. If the apparatus 1402 senses the channel is idle then the apparatus 1402 transmits prepared data. Otherwise, the apparatus 1402 may defer for some period before determining again whether or not the wireless medium is free for transmission. A method for performing CSMA may employ various gaps between consecutive transmissions to avoid collisions. In an aspect, transmissions may be referred to as frames and a gap between frames is referred to as an Interframe Spacing (IFS). Frames may be any one of user data, control frames, management frames, and the like.

IFS time durations may vary depending on the type of time gap provided. Some examples of IFS include a Short Interframe Spacing (SIFS), a Point Interframe Spacing (PIFS), and a DCF Interframe Spacing (DIFS) where SIFS is shorter than PIFS, which is shorter than DIFS. Transmissions following a shorter time duration will have a higher priority than one that must wait longer before attempting to access the channel.

A wireless apparatus may include various components that perform functions based on signals that are transmitted by or received at the wireless apparatus. For example, in some implementations a wireless apparatus comprises a user interface configured to output an indication based on a received signal as taught herein.

A wireless apparatus as taught herein may communicate via one or more wireless communication links that are based on or otherwise support any suitable wireless communication technology. For example, in some aspects a wireless apparatus may associate with a network such as a local area network (e.g., a Wi-Fi network) or a wide area network. To this end, a wireless apparatus may support or otherwise use one or more of a variety of wireless communication technologies, protocols, or standards such as, for example, Wi-Fi, WiMAX, CDMA, TDMA, OFDM, and OFDMA. Also, a wireless apparatus may support or otherwise use one or more of a variety of corresponding modulation or multiplexing schemes. A wireless apparatus may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., nodes or devices). In some aspects, a wireless apparatus (e.g., a wireless node or wireless device) implemented in accordance with the teachings herein may comprise an access point, a relay, or an access terminal.

An access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

A relay may comprise, be implemented as, or known as a relay node, a relay device, a relay station, a relay apparatus, or some other similar terminology. As discussed above, in some aspects, a relay may comprise some access terminal functionality and some access point functionality.

In some aspects, a wireless apparatus comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless apparatus also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communication (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1xRTT, 1xEV-DO Rel0, RevA, RevB) technology and other technologies.

Figure 17:
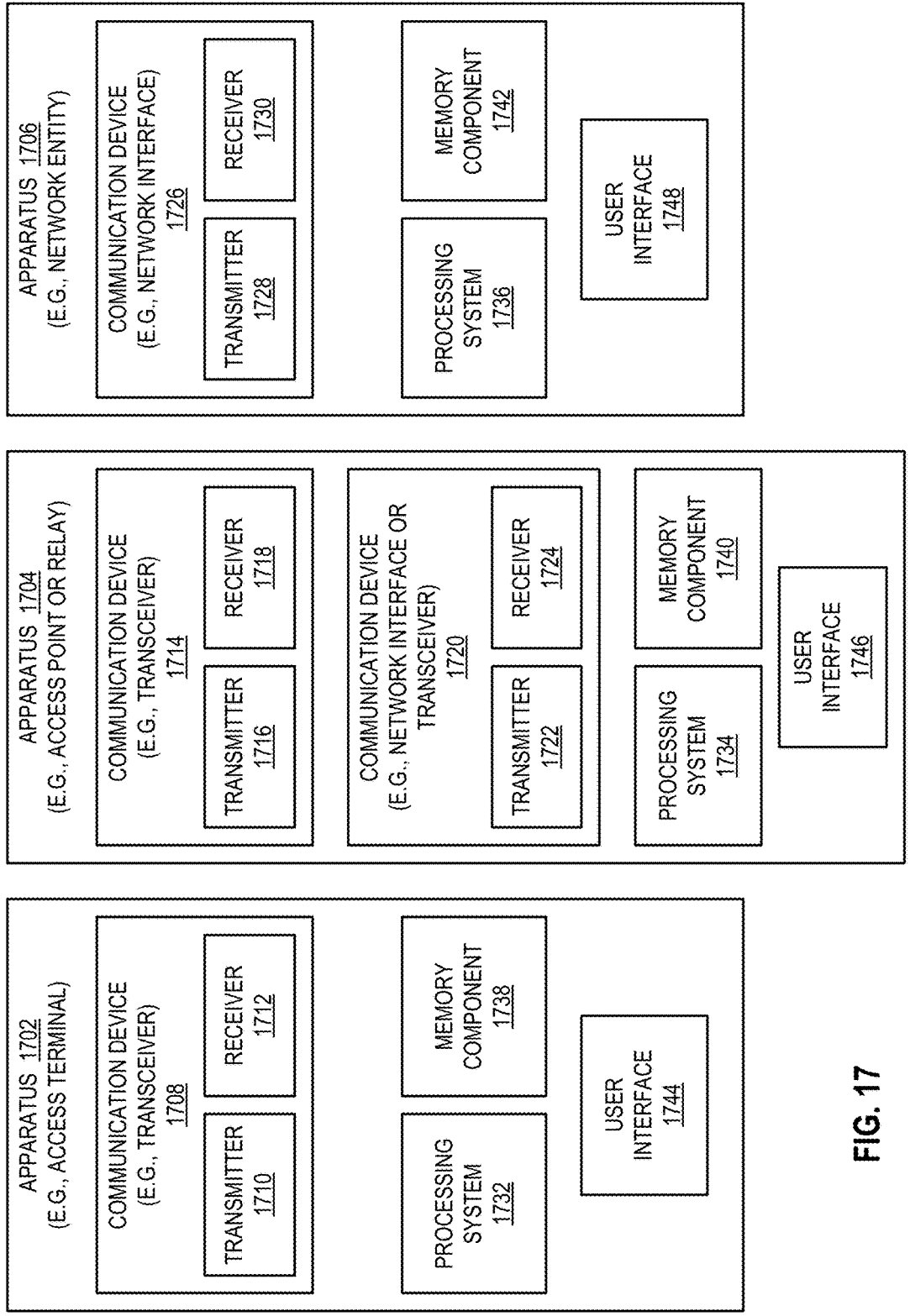
FIG. 17 is a simplified block diagram of several sample aspects of components that may be employed in communication nodes.

FIG. 17 illustrates several sample components (represented by corresponding blocks) that may be incorporated into an apparatus 1702, an apparatus 1704, and an apparatus 1706 (e.g., corresponding to an access terminal, an access point or relay, and a network entity (e.g., network device), respectively) to perform communication operations as taught herein. It should be appreciated that these components may be implemented in different types of apparatuses in different implementations (e.g., in an ASIC, in a system on a chip (SoC), etc.). The described components also may be incorporated into other apparatuses in a communication system. For example, other apparatuses in a system may include components similar to those described to provide similar functionality. Also, a given apparatus may contain one or more of the described components. For example, an apparatus may include multiple transceiver components that enable the apparatus to operate on multiple carriers and/or communicate via different technologies.

The apparatus 1702 and the apparatus 1704 each include at least one wireless communication device (represented by the communication devices 1708 and 1714 (and the communication device 1720 if the apparatus 1704 is a relay)) for communicating with other nodes via at least one designated radio access technology. Each communication device 1708 includes at least one transmitter (represented by the transmitter 1710) for transmitting and encoding signals (e.g., messages, indications, information, and so on) and at least one receiver (represented by the receiver 1712) for receiving and decoding signals (e.g., messages, indications, information, pilots, and so on). Similarly, each communication device 1714 includes at least one transmitter (represented by the transmitter 1716) for transmitting signals (e.g., messages, indications, information, pilots, and so on) and at least one receiver (represented by the receiver 1718) for receiving signals (e.g., messages, indications, information, and so on). If the apparatus 1704 is a relay, each communication device 1720 includes at least one transmitter (represented by the transmitter 1722) for transmitting signals (e.g., messages, indications, information, pilots, and so on) and at least one receiver (represented by the receiver 1724) for receiving signals (e.g., messages, indications, information, and so on).

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In some aspects, a wireless communication device (e.g., one of multiple wireless communication devices) of the apparatus 1704 comprises a network listen module.

The apparatus 1706 (and the apparatus 1704 if it is an access point) includes at least one communication device (represented by the communication device 1726 and, optionally, 1720) for communicating with other nodes. For example, the communication device 1726 may comprise a network interface that is configured to communicate with one or more network entities via a wire-based or wireless backhaul. In some aspects, the communication device 1726 may be implemented as a transceiver configured to support wire-based or wireless signal communication. This communication may involve, for example, sending and receiving: messages, parameters, or other types of information. Accordingly, in the example of FIG. 17, the communication device 1726 is shown as comprising a transmitter 1728 and a receiver 1730. Similarly, if the apparatus 1704 is an access point, the communication device 1720 may comprise a network interface that is configured to communicate with one or more network entities via a wire-based or wireless backhaul. As with the communication device 1726, the communication device 1720 is shown as comprising a transmitter 1722 and a receiver 1724.

The apparatuses 1702, 1704, and 1706 also include other components that may be used in conjunction with communication operations as taught herein. The apparatus 1702 includes a processing system 1732 for providing functionality relating to, for example, communicating with the apparatus 1704 (or some other apparatus) as taught herein and for providing other processing functionality. The apparatus 1704 includes a processing system 1734 for providing functionality relating to, for example, communicating with the apparatus 1702 (or some other apparatus) as taught herein and for providing other processing functionality. The apparatus 1706 includes a processing system 1736 for providing functionality relating to, for example, supporting communication by the apparatuses 1702 and 1704 (or some other apparatuses) as taught herein and for providing other processing functionality. The apparatuses 1702, 1704, and 1706 include memory devices 1738, 1740, and 1742 (e.g., each including a memory device), respectively, for maintaining information (e.g., parameters, and so on). In addition, the apparatuses 1702, 1704, and 1706 include user interface devices 1744, 1746, and 1748, respectively, for providing indications (e.g., audible and/or visual indications) to a user and/or for receiving user input (e.g., upon user actuation of a sensing device such a keypad, a touch screen, a microphone, and so on).

For convenience, the apparatus 1702 is shown in FIG. 17 as including components that may be used in the various examples described herein. In practice, the illustrated blocks may have different functionality in different aspects. For example, functionality of the block 1734 for supporting the operations of FIG. 4 may be different as compared to functionality of the block 1734 for supporting the operations of FIG. 6.

The components of FIG. 17 may be implemented in various ways. In some implementations, the components of FIG. 17 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1708, 1732, 1738, and 1744 may be implemented by processor and memory component(s) of the apparatus 1702 (e.g., by execution of appropriate code and/or by appropriate configuration of processor components). Similarly, some or all of the functionality represented by blocks 1714, 1720, 1734, 1740, and 1746 may be implemented by processor and memory component(s) of the apparatus 1704 (e.g., by execution of appropriate code and/or by appropriate configuration of processor components). Also, some or all of the functionality represented by blocks 1726, 1736, 1742, and 1748 may be implemented by processor and memory component(s) of the apparatus 1706 (e.g., by execution of appropriate code and/or by appropriate configuration of processor components).

Figure 18:
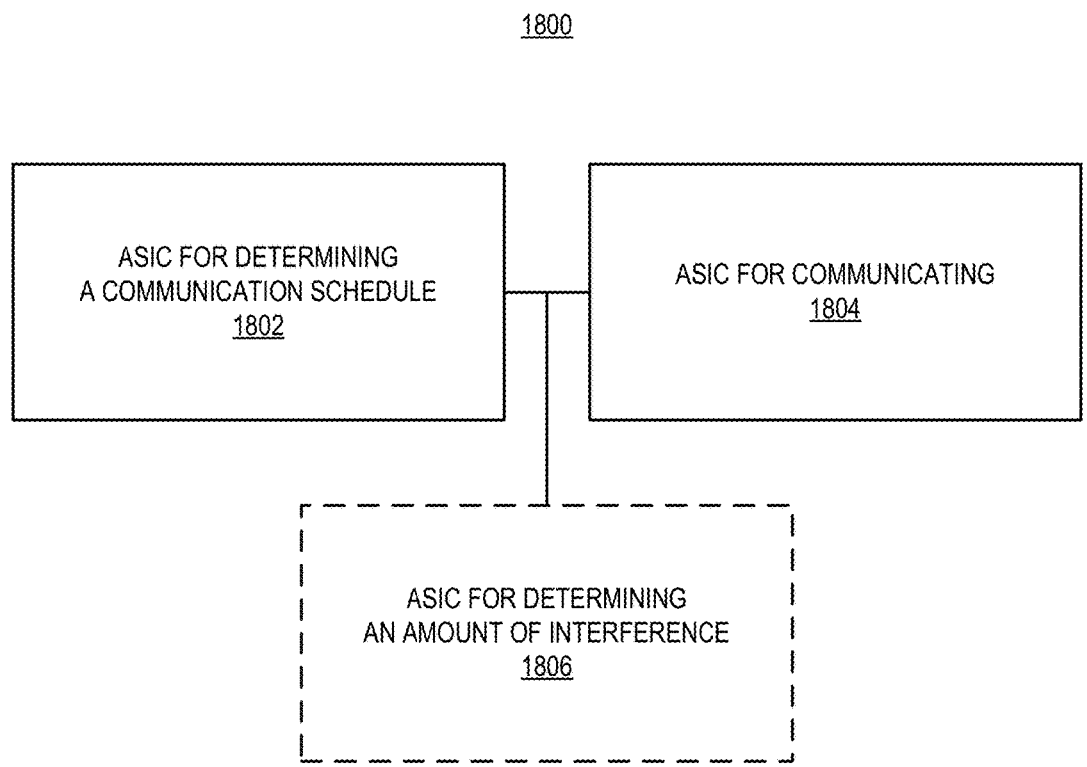
FIG. 18 is simplified block diagram of several sample aspects of an apparatus configured with functionality relating to parameter determination as taught herein.

The components described herein may be implemented in a variety of ways. Referring to FIG. 18, an apparatus 1800 is represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatus 1800 includes one or more modules that may perform one or more of the functions described above with regard to various figures. For example, an ASIC for determining a communication schedule 1802 may correspond to, for example, a processing system as discussed herein. An ASIC for communicating 1804 may correspond to, for example, a communication device as discussed herein. An ASIC for determining an amount of interference 1806 may correspond to, for example, a processing system as discussed herein.

As noted above, in some aspects these modules may be implemented via appropriate processor components. These processor components may in some aspects be implemented, at least in part, using structure as taught herein. In some aspects, a processor may be configured to implement a portion or all of the functionality of one or more of these modules. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. In some aspects one or more of any components represented by dashed boxes are optional.

As noted above, the apparatus 1800 comprise one or more integrated circuits in some implementations. For example, in some aspects a single integrated circuit implements the functionality of one or more of the illustrated components, while in other aspects more than one integrated circuit implements the functionality of one or more of the illustrated components. As one specific example, the apparatus 1800 may comprise a single device (e.g., with components 1802-1806 comprising different sections of an ASIC). As another specific example, the apparatus 1800 may comprise several devices (e.g., with the components 1802 and 1806 comprising one ASIC, and the component 1804 comprising another ASIC).

In addition, the components and functions represented by FIG. 18 as well as other components and functions described herein, may be implemented using any suitable means. Such means are implemented, at least in part, using corresponding structure as taught herein. For example, the components described above in conjunction with the "ASIC for" components of FIG. 18 correspond to similarly designated "means for" functionality. Thus, one or more of such means is implemented using one or more of processor components, integrated circuits, or other suitable structure as taught herein in some implementations. Several examples follow.

In some implementations, processing system structure such as an ASIC or a programmable processor is configured to embody the functionality of the means for determining a communication schedule. For example, this structure may be programmed or designed to communicate with another component (e.g., a communication device or memory device) to receive a signal comprising data that is indicative of the communication schedule. In addition, this structure may be programmed or designed to generate (e.g., output) an indication of the determined communication schedule. In some implementations, the structure is configured to implement the functionality described in conjunction with one or more of blocks 202, 402, 602, or 1002 of the figures. In some implementations, the structure is configured to implement the following functionality. The structure determines that a communication schedule of first transceiver is needed (e.g., upon detection of the first transceiver and determining that the first transceiver is operating on a potentially infringing frequency band). The structure then generates a signal (e.g., a message) that requests the communication schedule from the first transceiver or some other entity. Next, the structure monitors for a response to the request. Upon receiving the response (containing the communication schedule), the structure may, for example, maintain a record of the communication or generate an indication of the communication (e.g., to be passed to another component).

In some implementations, communication device structure such as a transceiver is configured to embody the functionality of the means for communicating. For example, this structure may be programmed or designed to establish communication with another device, exchange information (e.g., the communication schedule) used to determine a communication control parameter, and exchange a determined communication control parameter. In addition, this structure may be programmed or designed to generate an indication of the determined communication control parameter (e.g., to be passed to another component). Typically, the communication device structure comprises a wireless-based transceiver device or wire-based transceiver device.

In some implementations, processing system structure such as an ASIC or a programmable processor is configured to embody the functionality of the means for determining an amount of interference. This structure may be programmed or designed to receive an indication of signals being received. This structure may process received data to determine packet loss or frame error rate, and thereby determine (e.g., estimate) the amount of interference present. For example, an increase in packet loss of 10% over baseline packet loss (without interference) may be characterized as "X" amount of interference. The structure also may analyze channel conditions such as RSSI and SNR, and thereby determine (e.g., estimate) the amount of interference present on a channel. For example, an RSSI of "Y" dB may be characterized as "X" amount of interference. In some implementations, the structure is configured to implement the interference functionality described in conjunction with one or more of FIGS. 7, 8, 11, and 12.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code executable (e.g., executable by at least one computer) to provide functionality relating to one or more of the aspects of the disclosure. In some aspects, a computer program product may comprise packaging materials.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product. Although particular aspects are described herein, many variations and permutations of these aspects fall within the scope of the disclosure.

Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the description.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for communication, comprising:
   a processing system configured to determine a communication schedule of another apparatus associated with a first technology comprising a wireless wide area network (WWAN) technology, wherein the communication schedule comprises a discontinuous reception (DRX) off period associated with the WWAN technology; and
   a communication device configured to communicate with the another apparatus to determine at least one communication control parameter, wherein the determination of the at least one communication control parameter is based on the determined communication schedule, and wherein the communication with the another apparatus comprises using the at least one communication control parameter to communicate with the another apparatus based on the DRX off period associated with the WWAN technology via a second technology comprising a wireless local area network (WLAN) technology.

2. The apparatus of claim 1, wherein the another apparatus comprises a first transceiver associated with the first technology, and wherein the communication device comprises a second transceiver associated with the second technology.

3. The apparatus of claim 2, wherein the first transceiver and the second transceiver are co-located.

4. The apparatus of claim 1, wherein:
the first technology comprises LTE technology; and
the second technology comprises IEEE 802.11ah technology.

5. The apparatus of claim 1, wherein:
the determination of the at least one communication control parameter comprises selecting a restricted access window for the second technology such that the restricted access window falls within the DRX off period.

6. The apparatus of claim 1, wherein:
the determination of the at least one communication control parameter comprises selecting a target wake time for the second technology such that the target wake time falls within the DRX off period.

7. The apparatus of claim 1, wherein:
the processing system is further configured to determine, for each directional antenna sector of a plurality of directional antenna sectors associated with the second technology, an amount of interference between communication associated with the first technology and communication associated with the second technology; and
the determination of the at least one communication control parameter comprises selecting one of the directional antenna sectors that is associated with a lowest amount of interference between communication associated with the first technology and communication associated with the second technology.

8. The apparatus of claim 1, wherein:
the determination of the at least one communication control parameter comprises selecting a time for transmission of control information associated with the second technology that falls within the DRX off period.

9. The apparatus of claim 1, wherein:
the at least one communication control parameter comprises a rate for transmission of control information associated with the second technology;
the processing system is further configured to determine an amount of interference between communication associated with the first technology and communication associated with the second technology; and
the determination of the at least one communication control parameter comprises selecting the rate based on the interference.

10. The apparatus of claim 1, wherein the communication schedule comprises a power save schedule.

11. The apparatus of claim 1, wherein the communication schedule comprises a periodic communication schedule.

12. A method of communication, comprising:
determining, at a first apparatus, a communication schedule of a second apparatus associated with a first technology comprising a wireless wide area network (WWAN) technology, wherein the communication schedule comprises a discontinuous reception (DRX) off period associated with the WWAN technology; and
communicating with the second apparatus to determine at least one communication control parameter, wherein the determination of the at least one communication control parameter is based on the determined communication schedule, and wherein the communicating with the second apparatus comprises using the at least one communication control parameter to communicate with the second apparatus based on the DRX off period associated with the WWAN technology via a second technology comprising a wireless local area network (WWAN) technology.

13. The method of claim 12, wherein the second apparatus comprises a first transceiver associated with the first technology, and wherein the first apparatus comprises a second transceiver associated with the second technology.

14. The method of claim 13, wherein the first transceiver and the second transceiver are co-located.

15. The method of claim 12, wherein:
the first technology comprises LTE technology; and
the second technology comprises IEEE 802.11ah technology.

16. The method of claim 12, wherein:
the determination of the at least one communication control parameter comprises selecting a restricted access window for the second technology such that the restricted access window falls within the DRX off period.

17. The method of claim 12, wherein:
the determination of the at least one communication control parameter comprises selecting a target wake time for the second technology such that the target wake time falls within the DRX off period.

18. The method of claim 12, wherein:
the method further comprises determining, for each directional antenna sector of a plurality of directional antenna sectors associated with the second technology, an amount of interference between communication associated with the first technology and communication associated with the second technology; and
the determination of the at least one communication control parameter comprises selecting one of the directional antenna sectors that is associated with a lowest amount of interference between communication associated with the first technology and communication associated with the second technology.

19. The method of claim 12, wherein:
the determination of the at least one communication control parameter comprises selecting a time for transmission of control information associated with the second technology that falls within the DRX off period.

20. The method of claim 12, wherein:
the at least one communication control parameter comprises a rate for transmission of control information associated with the second technology;
the method further comprises determining an amount of interference between communication associated with the first technology and communication associated with the second technology; and
the determination of the at least one communication control parameter comprises selecting the rate based on the interference.

21. The method of claim 12, wherein the communication schedule comprises a power save schedule.

22. The method of claim 12, wherein the communication schedule comprises a periodic communication schedule.

23. An apparatus for communication, comprising:
means for determining a communication schedule of another apparatus associated with a first technology comprising a wireless wide area network (WWAN)

technology, wherein the communication schedule comprises a discontinuous reception (DRX) off period associated with the WWAN technology; and means for communicating with the another apparatus to determine at least one communication control parameter, wherein the determination of the at least one communication control parameter is based on the determined communication schedule, and wherein the means for communicating with the another apparatus is configured to use the at least one communication control parameter to communicate with the another apparatus based on the DRX off period associated with the WWAN technology via a second technology comprising a wireless local area network (WLAN) technology.

24. The apparatus of claim 23, wherein the another apparatus comprises a first transceiver associated with the first technology, and wherein the means for communicating comprises a second transceiver associated with the second technology.

25. The apparatus of claim 24, wherein the first transceiver and the second transceiver are co-located.

26. The apparatus of claim 23, wherein:
the first technology comprises LTE technology; and
the second technology comprises IEEE 802.11ah technology.

27. The apparatus of claim 23, wherein:
the determination of the at least one communication control parameter comprises selecting a restricted access window for the second technology such that the restricted access window falls within the DRX off period.

28. The apparatus of claim 23, wherein:
the determination of the at least one communication control parameter comprises selecting a target wake time for the second technology such that the target wake time falls within the DRX off period.

29. The apparatus of claim 23, further comprising means for determining, for each directional antenna sector of a plurality of directional antenna sectors associated with the second technology, an amount of interference between communication associated with the first technology and communication associated with the second technology, wherein:
the determination of the at least one communication control parameter comprises selecting one of the directional antenna sectors that is associated with a lowest amount of interference between communication associated with the first technology and communication associated with the second technology.

30. The apparatus of claim 23, wherein:
the determination of the at least one communication control parameter comprises selecting a time for transmission of control information associated with the second technology that falls within the DRX off period.

31. The apparatus of claim 23, wherein:
the at least one communication control parameter comprises a rate for transmission of control information associated with the second technology;
the apparatus further comprises means for determining an amount of interference between communication associated with the first technology and communication associated with the second technology; and
the determination of the at least one communication control parameter comprises selecting the rate based on the interference.

32. The apparatus of claim 23, wherein the communication schedule comprises a power save schedule.

33. The apparatus of claim 23, wherein the communication schedule comprises a periodic communication schedule.

34. A non-transitory computer-readable medium comprising code executable to:
determine, at a first apparatus, a communication schedule of a second apparatus associated with a first technology comprising a wireless wide area network (WWAN) technology, wherein the communication schedule comprises a discontinuous reception (DRX) off period associated with the WWAN technology; and
communicate with the second apparatus to determine at least one communication control parameter, wherein the determination of the at least one communication control parameter is based on the determined communication schedule, and wherein the communication with the second apparatus comprises using the at least one communication control parameter to communicate with the second apparatus based on the DRX off period associated with the WWAN technology via a second technology comprising a wireless local area network (WLAN) technology.

35. A wireless device, comprising:
an antenna;
a processing system configured to determine a communication schedule of another apparatus associated with a first technology comprising a wireless wide area network (WWAN) technology, wherein the communication schedule comprises a discontinuous reception (DRX) off period associated with the WWAN technology; and
a communication device configured to communicate via the antenna with the another apparatus to determination at least one communication control parameter, wherein the determination of the at least one communication control parameter is based on the determined communication schedule, and wherein the communication with the another apparatus comprises using the at least one communication control parameter to communicate with the another apparatus based on the DRX off period associated with the WWAN technology via a second technology comprising a wireless local area network technology.

* * * * *